United States Patent [19]
Koyama

[11] Patent Number: 5,631,795
[45] Date of Patent: May 20, 1997

[54] LINE FAULT MONITORING APPARATUS

[75] Inventor: Kiyoaki Koyama, Tokyo, Japan

[73] Assignee: Hochiki Corporation, Tokyo, Japan

[21] Appl. No.: 708,876

[22] Filed: Sep. 5, 1996

Related U.S. Application Data

[63] Continuation of Ser. No. 249,266, Apr. 25, 1994, abandoned.

[30] Foreign Application Priority Data

May 25, 1993 [JP] Japan .................................. 5-122213

[51] Int. Cl.⁶ .......................................... H02H 7/26
[52] U.S. Cl. .................. 361/68; 361/67; 361/62; 361/93; 340/650; 340/635
[58] Field of Search ................... 361/62–68, 69, 361/70, 93; 340/650, 664, 635

[56] References Cited

U.S. PATENT DOCUMENTS

| Re. 28,958 | 9/1976 | Zafiropulo et al. | 340/147 SC |
|---|---|---|---|
| Re. 34,643 | 6/1994 | Payne | 361/62 |
| 3,652,798 | 3/1972 | McNeilly et al. | 179/15 AL |
| 3,686,531 | 8/1972 | Decker et al. | 317/27 R |
| 4,752,698 | 6/1988 | Furuyama et al. | 307/116 |
| 5,097,259 | 3/1992 | Testa et al. | 340/825.36 |

FOREIGN PATENT DOCUMENTS

| 62-73400 | 4/1987 | Japan | G08B 25/00 |
|---|---|---|---|
| 63-19098 | 1/1988 | Japan | G08B 29/00 |
| 1383777 | 2/1975 | United Kingdom | G08C 25/02 |
| 1567971 | 5/1980 | United Kingdom | H04L 11/08 |
| 2198001 | 6/1988 | United Kingdom | G01R 31/08 |

*Primary Examiner*—Jeffrey A. Gaffin
*Assistant Examiner*—Sally C. Medley
*Attorney, Agent, or Firm*—Sughrue, Mion, Zinn, Macpeak & Seas

[57] ABSTRACT

The present invention relates to a line fault monitor for detecting a short circuit in a terminal-side loop line and disconnecting the short-circuit portion from a power supply, so that the position of the short circuit can easily be specified. The line fault monitor includes at least one of a mid-point line monitoring device and a beginning/end line monitoring device. The mid-point line monitoring device has a first fault indicator lamp for indicating a fault in a line connected to one terminal, and a second fault indicator lamp for indicating a fault in a line connected to the other terminal. The beginning/end line monitoring device in the side of a receiver has a first fault indicator lamp for indicating a fault in a line connected to a beginning terminal, a second fault indicator lamp for indicating a fault in a line connected to an end terminal, and a representative fault indicator lamp for representatively indicating a fault in any one of the lines connected to the beginning and the end terminals.

15 Claims, 13 Drawing Sheets

LINE FAULT MONITORING APPARATUS

This is a continuation of application Ser. No. 08/249,266 filed Apr. 25, 1994 now abandoned.

BACKGROUND OF THE INVENTION

1. Field of the Invention

The invention relates to a line fault monitoring apparatus which detects a short circuit of lines and isolates the short-circuit portion from a power source side.

2. Description of the Related Art

Conventionally, such a line fault monitor which is called a short-circuit isolator is disclosed in Unexamined Japanese Patent Publication No. SHO. 63-19098.

In such a line fault monitor, lines in a terminal side are connected to a receiver in a loop manner, and one or more short-circuit isolators are provided in the loop lines. If a short circuit occurs in the lines, the short-circuit isolators positioned in both sides of the short-circuit portion disconnect the short-circuit side. Then, the power is supplied to the remaining normal lines so that the monitoring condition is maintained.

As shown in FIG. 15 which is a system explanation diagram of the Unexamined Japanese Patent Publication No. SHO. 63-19098, the line fault monitor includes following elements. A receiver 301 stores a power source and receiving circuit 301a therein. A pair of power/signal lines 302a and 302b are extended from the receiver 301 from terminals 311, 312. The lines are returned to the receiver 301 in a loop form. Between the lines 302a and 302b connected to the receiver 301 in a loop form, terminal loads 303 which are relays, sensor or the like is connected in parallel, and further, line fault monitors 304a and 304b are inserted and connected in each group in which a predetermined number of the terminal loads 303 are provided. According to the insertion and connection of the line fault monitors, the loop connected lines 302a and 302b are separated into sections of L1, L2, and L3. Further, the receiver 301 is provided with a pair of line fault monitors 315a and 315b, each having power source side terminals 309 and 310, and which are connected each other and connect to a receiver circuit 301a, and having respective load side terminals 311 and 312 of the line fault monitor 315a and 315b as loop connection terminals to the receiver 301.

Further, Unexamined Japanese Patent Publication No. SHO. 62-73400 discloses a alarm apparatus in which a pair of lines which are power line and power/signal line are separated in a plurality of sections and an isolating circuit is provided in each section. If a short circuit occurs in one section, the section is isolated by the isolating circuit so as to prevent shutting down the system. In addition, the isolating circuit includes an latching relay having an isolation contact inserted in the line. Furthermore, the Publication suggests an indicator which indicates the moving state of the latching relay.

As shown in FIG. 16 which is a block diagram of the Unexamined Japanese Patent Publication No. SHO. 62-73400, the alarm apparatus includes a central monitor RC, a pair of lines that are power line L and power/signal line C both extending from the central monitor RC, a plurality of terminals SN connected between the lines L and C, a plurality of isolating circuits inserted between the lines L and C, and a plurality of isolation circuit DX which are inserted between the pair of lines L and C so as to divide the lines in a plurality of zones. The pair of lines L and C may be loop form lines as indicated by broken lines.

Thus constructed alarm apparatus detects a short circuit of the lines following manner. The terminals SN are supplied a power from the central monitor RC through a pair of lines L and C so that the terminal SN is in monitoring state. The terminal SN sends a detection signal detected by a sensor of fire, gas or the like or a judgement signal based on thus detected signal to the central monitor RC. The central monitor RC conducts a fault judgement based on the signal sent from the terminal SN and, if necessary, conducts a alarm indication.

If a short circuit occurs somewhere on the lines L and C, the power can not be supplied to all of the terminals SN, thereby downing the whole system. However, an isolation circuit which is the nearest one to the short-circuited zone isolates the short-circuited zone. Accordingly, remaining system including terminals SN maintain a normal monitoring state.

However, according to the conventional line fault monitor disclosed in Unexamined Japanese Patent Publication No. SHO. 63-19098, when a short-circuit occurs, the downing of the whole system can be prevented but the position at which the short circuit occurs cannot be specified. Therefore, there exists a problem in that the restoration requires much labor and a long time.

Further, the conventional alarm apparatus monitor disclosed in Unexamined Japanese Patent Publication No. SHO. 62-73400 can detect the operation of the isolation circuit, but can not determine a line which side of the isolation circuit is short-circuited.

Accordingly, in case of restoring the short-circuited line, the voltages on the lines in both sides of the isolation circuit have to be measured so as to specify the short-circuited line. Therefore, the conventional alarm apparatus has the following problems. If a measurement instrument is connected to a line in a normal state to measure the line voltage or the operation error of the instrument occurs in the measurement, noises may occur in the line which may cause of a transmission trouble or a false signal. In addition, when the power of the alarm system is off to inspect the lines, the detection of a fire or the like can not be detected during the inspection.

SUMMARY OF THE INVENTION

It is an object of the present invention to provide a line fault monitor which can easily specify a position where a short circuit occurs.

A line fault monitoring apparatus of the present invention includes: a receiver for monitoring disasters and supplying a power source; a plurality of terminals, each of which has a self address responding to a call signal designating the self address, including short-circuit indicator for indicating a side in which a short-circuit occurs in the signal lines; a plurality of signal lines elongated from the receiver, which are connected to the receiver in a loop form; a beginning/end line monitor which includes beginning and end terminals connected to the signal lines, and short-circuit indicator for indicating a side in which a short-circuit occurs in the signal lines; and a plurality of mid-point line monitoring devices which are disposed in the signal lines, wherein at least one terminal is interposed between two mid-point line monitoring devices; wherein, when the signal lines are normal, a power is supplied to the signal lines through the beginning terminal of the beginning/end line monitor and the mid-point line monitoring devices in the signal line are sequentially operated to supply the power to an end of the beginning/end line monitoring device, and, when a fault occurs in the signal lines, the power supply is shut off at a position short of the line fault position and the power is supplied through the end terminal to stop the power supply at a position short of the line fault position.

According to the line fault monitoring apparatus of the present invention, when a short circuit occurs, the beginning/end line monitor which is located in or in the vicinity of the receiver, and the mid-point line monitors which are connected in the loop lines are checked. The fault indicator lamp provided in one of the monitors which disconnects the short-circuit portion lights up, so as to indicate which side of the lines includes the short circuit. Therefore, the short-circuit zone is easily specified from the lighting of the fault indicator lamp, so that a rapid restoration operation can be performed.

PREFERRED EMBODIMENTS OF THE INVENTION

The preferred embodiments of an line fault monitoring apparatus of the present invention will be described as follows referring to the accompanying drawings.

This embodiments contains the following contents.

1. Whole construction and operation of the monitor
2. Embodiment of the mid-point line monitor
3. Embodiment of the beginning/end line monitor
4. Operation of the beginning/end line monitor

1. Whole construction and operation of the monitor

Figure 1:
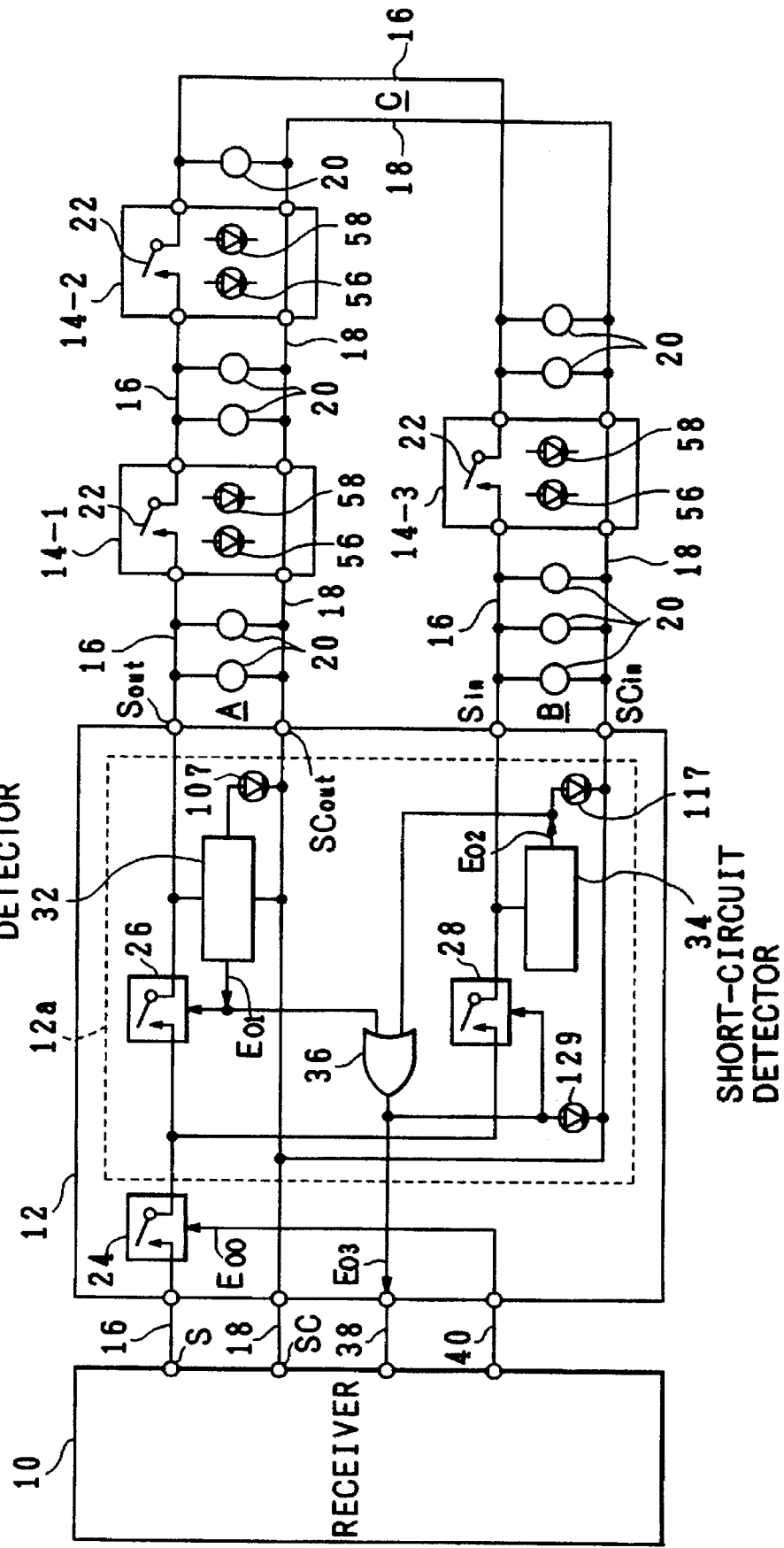
FIG. 1 is a block diagram showing the whole construction of a line fault monitor of the invention.

FIG. 1 is a block diagram showing a basic embodiment of the invention. In FIG. 1, a receiver 10 performs centralized monitoring of a fault such as fire, gas leak and the like. From terminals S and SC of the receiver 10, signal lines 16 and 18 are extended so as to connect the receiver 10 to a beginning/end line monitoring device 12. A control signal line 40 and a line fault reply signal line 38 are connected to the beginning/end line monitoring device 12.

The beginning/end line monitoring device 12 has beginning terminals Sout and SCout in the side of a beginning A, and end terminals Sin and SCin in the side of an end B. A plus signal line 16 and a minus signal line 18 are extended from the terminals Sout and SCout in the beginning A side. The signal lines 16 and 18 are connected to the end terminals Sin and SCin in the end B side by way of the terminal device side of the system in a loop form.

A plurality of terminal devices 20 are connected between the signal lines 16 and 18 which are connected in a loop form to the S, and SC terminals. Each terminal device 20 includes a sensor or the like which receives the power supply from the receiver 10 and monitors a fault such as fire. In addition, mid-point line monitoring devices 14-1, 14-2, and 14-3 are connected in the signal lines 16 and 18 which are connected in a loop form to the terminal device side.

Each of the mid-point line monitoring devices 14-1 to 14-3 includes a switch 22 realized by an FET or the like. When each of the mid-point line monitoring devices 14-1 to 14-3 receives the power supply through either one of the terminals disposed in both sides, the switch 22 is turned ON if there is no short circuit in the lines in the other terminal side, so as to supply the power between the signal lines 16 and 18 in the next stage. If the signal lines 16 and 18 in the output side is short-circuited, the switch 22 maintains its OFF state, so as to stop the power supply to the short circuit zone.

Each of the mid-point line monitoring devices 14-1 to 14-3 has a first and second fault indicator lamps 56 and 58. When the power is received through the terminals in the right side of the drawing, the fault indicator lamp 56 detects a short circuit in the lines connected to the terminals of the left side and indicates the line fault. In contrast, when the power supply is received through the terminals in the left side of the drawing, the fault indicator lamp 58 in the right side detects a short circuit in the lines connected to the terminal in the right side and indicates the line fault. The mid-point line monitoring devices 14-1 to 14-3 will be described later in more detail.

The beginning/end line monitoring device 12 includes switches 24, 26 and 28 each realized by an FET or the like. The switch 24 is turned ON in response to a control signal $E_{oo}$ supplied from the receiver 10 through the control signal line 40, so as to supply the power to a circuit portion 12a surrounded by a broken line in the drawing of the beginning/end line monitoring device 12. The ON/OFF operation of the switch 24 in accordance with the control Signal $E_{oo}$ may be conducted through a photo coupler. The switch 26 is disposed in a power source line to the terminal Sout in the beginning A side. The switch 28 is disposed in a power source line connected to the terminal Sin in the end B side.

The monitoring device 12 further includes short-circuit detectors 32 and 34. The short-circuit detector 32 detects a short circuit of the signal lines 16 and 18 which are connected to the terminals Sout and SCout in the beginning A side. The short-circuit detector 34 detects a short circuit of the signal lines 16 and 18 connected to the terminals Sin and SCin in the end B side. For the short-circuit detectors 32 and 34, a beginning fault indicator lamp 107 and an end fault indicator lamp 117 are provided, respectively. When a short circuit is detected at the beginning A or at the end B, the corresponding indicator lamp lights up so as to indicate the line fault.

The power supply through the beginning/end line monitoring device 12 is first performed on the signal lines 16 and 18 in the beginning A side, when the switch 24 is turned ON by the receiver 10. At this time, if the signal lines 16 and 18 in the beginning A side are normal, the short-circuit detector 32 does not detect a short circuit. Accordingly, the switch 26 is turned ON by the output signal $E_{O1}$ produced at this time, so as to perform the power supply through the beginning A. If the lines in respective zones are normal, the mid-point line monitoring devices 14-1, 14-2, and 14-3 which receive the power through the beginning A of the beginning/end line monitoring device 12 sequentially turn ON the switches 22.

After the elapse of the sequential operation time of switches 22 in the mid-point line monitoring devices 14-1 to 14-3, therefore, the supplied source voltage is normally applied across the terminals Sin and SCin in the end B side. Thus, the source voltage supplied through the beginning A is normally applied to the end B after a predetermined time so that the short-circuit detector 34 judges the normal of the end terminal side and maintains the switch 28 in the OFF state.

When the switch 24 is turned ON, if the signal lines 16 and 18 in the beginning A side is short-circuited, the short-circuit detector 32 detects the short circuit in the beginning A side. The switch 26 is maintained in the OFF state by the output signal $E_{O1}$ produced at this time. At the same time, the beginning fault indicator lamp 107 is caused to light up. Furthermore, the output signal $E_{O1}$ produced when a short circuit is detected is supplied to the receiver 10 through an OR gate 36 as a line fault signal $E_{O3}$.

At the same time, in response to the output of the OR gate 36, the switch 28 is turned ON and a representative fault indicator lamp 129 lights up. As the result of the turning ON of the switch 28 conducted when the short circuit in the beginning A side is detected, the power is supplied through the end B. When the power supply is conducted through the end B, the mid-point line monitoring devices are operated in the order of 14-3, 14-2, and 14-1, so as to turn ON the respective switches 22.

However, in the mid-point line monitoring device 14-1 which is located at a front portion of the signal lines 16 and 18 which are connected to the beginning A at which the short-circuit occurs, the short circuit of the signal lines 16 and 18 in the beginning A side is detected when the power is supplied from the preceding mid-point line monitoring device 14-2 in the front stage. In the device 14-1, accordingly, the switch 22 is maintained in the OFF state and the signal lines 16 and 18 in the beginning A side are disconnected. At the same time, the fault indicator lamp 56 lights up to indicate the line side in which the line is disconnected.

When the loop-connected signal lines 16 and 18 are short-circuited at a point C which is positioned between the mid-point line monitoring devices 14-2 and 14-3 disposed in the signal lines 16 and 18, the beginning/end line monitoring device 12 performs the power supply through the beginning A by the turning ON of the switch 24 by the receiver 10 and by the turning ON of the switch 26 in the normal state by the short-circuit detector 32. In reply to the power supply, the switch 22 in the mid-point line monitoring device 14-1 is turned ON. When the power is supplied to the succeeding mid-point line monitoring device 14-2, the short circuit at the point C is detected. Accordingly, the switch 22 is maintained in the OFF state, and the fault indicator lamp 58 in the side of the point C where the short circuit occurs lights up.

The power supply through the beginning A of the beginning/end line monitoring device 12 is isolated by turning OFF the switch 22, when a short circuit is detected by the mid-point line monitoring device 14. As a result, even after a predetermined time has elapsed, the source voltage is not applied to the terminals Sin and SCin in the end B side. The short-circuit detector 34 monitors whether or not the application of the source voltage after the elapse of the predetermined time exists. The terminal voltage is checked after the predetermined time. If the voltage is not applied, the detector judges that a line fault occurs, and outputs a fault detection signal $E_{O2}$.

The line fault detection signal is supplied to the receiver 10 via the OR gate 36, and causes the representative fault indicator lamp 129 to light up, and the switch 28 to be turned ON, so that the power is supplied through the end B. This line fault detection causes also the mid-point fault indicator lamp 117 to light up. However, the line voltage is recovered by the power supply through the end B, so that the lamp 117 goes out after the lighting.

In the case where the power supply is conducted through the end B, when the power is supplied to the mid-point line monitoring device 14-3 before the point C at which the short circuit occurs, the short circuit of the signal lines 16 and 18 in the point C side is detected. As a result of the detection, the switch 22 is maintained in the OFF state so as to disconnect the short-circuit zone. At the same time, the fault indicator lamp 58 indicating the fault line side lights up.

When the power is initially turned ON, if a short circuit of the signal lines 16 and 18 exists in the end B side of the beginning/end line monitoring device 12, the switches 22 of the mid-point line monitoring devices 14-1 and 14-2 are sequentially turned ON by the first power supply through the beginning A. When the power is supplied to the mid-point line monitoring device 14-3, the short circuit of the signal lines 16 and 18 in the end B side is detected, so that the switch 22 of the device 14-3 is maintained in the OFF state and the fault indicator lamp 56 lights up.

Because of the short circuit of the signal lines 16 and 18 in the end B, the source voltage is not applied to the terminals Sin and SCin at the end B even after the predetermined time has elapsed. Therefore, the short-circuit detector 34 detects the fault in the end B side and outputs the signal $E_{O2}$, so that the end fault indicator lamp 117 lights up. Also, the line fault signal $E_{O3}$ is output to the receiver 10 via the OR gate 36. At the same time, the representative fault indicator lamp 129 is caused to light up. In this case, the switch 28 is interlocked as a result of the detection of the short circuit in the end B side by the short-circuit detector 34, so as to be kept in the OFF state.

If the signal lines 16 and 18 is short-circuited under the state where the power is normally supplied to the terminals through the beginning/end line monitoring device 12, the source voltage applied to the terminals Sin and SCin at the end B is cut off. This is detected by the short-circuit detector 34 which in turn outputs the line fault detection signal $E_{O2}$ to the receiver 10 as the line fault signal $E_{O3}$ via the OR gate 36. When the receiver 10 receives the line fault signal $E_{O3}$, it outputs the control signal $E_{OO}$ to the switch 24 via the control signal line 40, so that the switch 24 which is in the ON state is once turned OFF and then turned ON again. Thus, the power-ON operation is restarted, so that the line zone in which the short circuit occurs can be isolated.

In the operation in response to a short circuit which occurs in the course of the normal power supply, the power supply may be restarted in such a manner that, instead of the control from the receiver 10, an automatic reset operation based on the line fault detection signal $E_{O2}$ indicative of the line fault detected by the short-circuit detector 34 may cause the short-circuit detector 32 in the beginning A side to operate in the same manner as the case where the power ON operation is conducted.

Figure 2A:
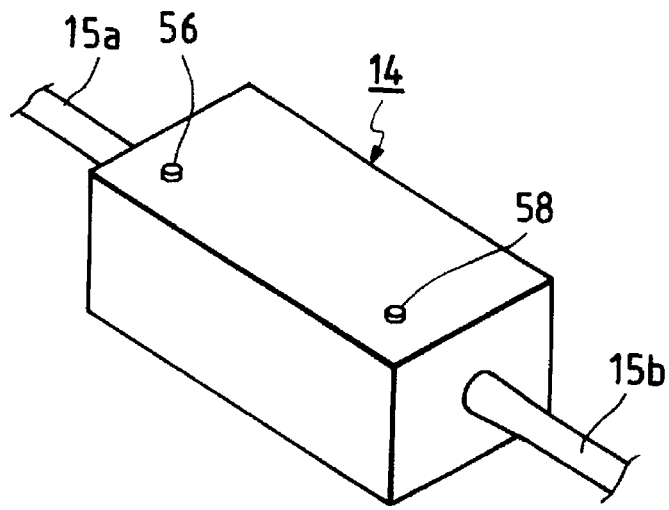
FIGS. 2(a) and 2(b) are views illustrating a mid-point line monitor.

FIG. 2(a) is a view showing the appearance of the mid-point line monitoring device which is disposed in the terminal side in FIG. 1. In FIG. 2(a), cables 15a and 15b are respectively extended from the both sides of a housing box of the mid-point line monitoring device 14. On the upper face of the housing box, disposed are the fault indicator lamp 56 for indicating a fault of the cable 15a, and the fault indicator lamp 58 for indicating a fault of the cable 15b.

Figure 2B:
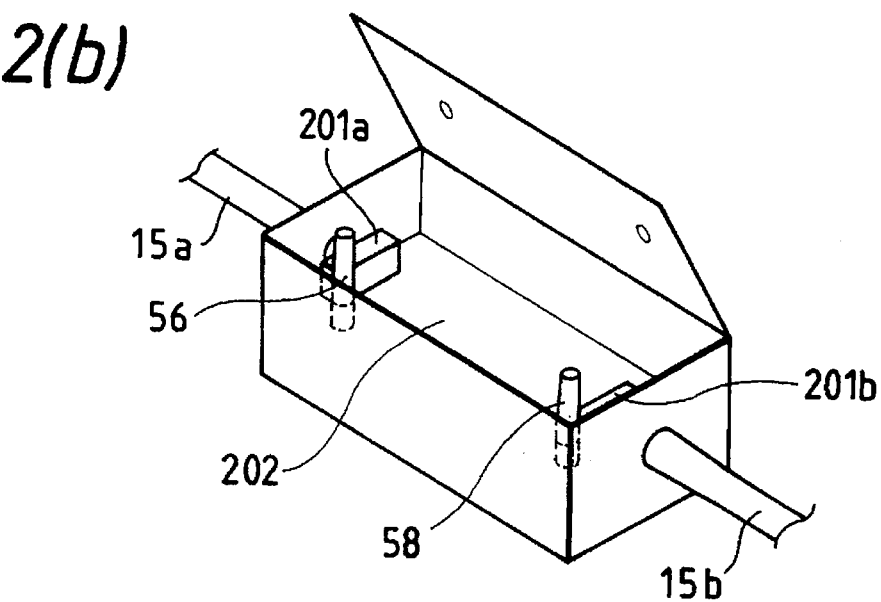

In addition, as shown in FIG. 2(b), the fault indicator lamps 56 and 58 can be stored in the housing box. In the housing box, a substrate 202 for the mod-point line monitoring device 14 and connector 201a and 201b connected to cables 15a and 15b respectively, which connects the substrate 202 and the cables.

Figure 3:
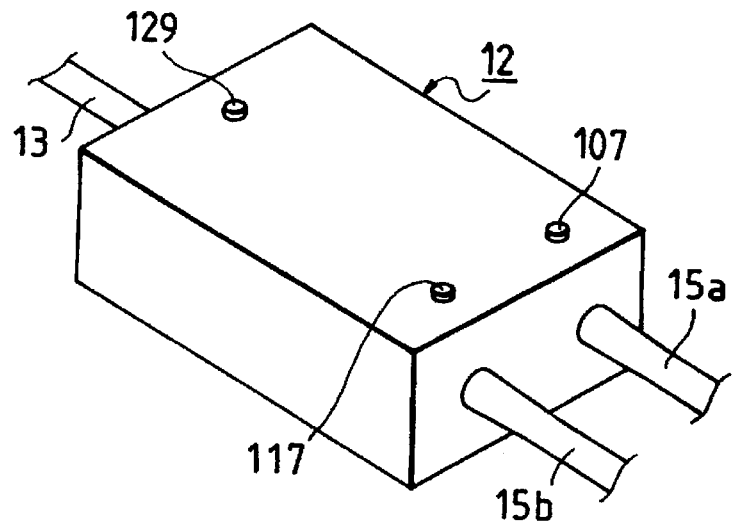
FIG. 3 is a view illustrating a beginning/end line monitor.

That is, when a short circuit occurs in the cable 15a side, the fault indicator lamp 56 lights up. When a short circuit occurs in the cable 15b side, the fault indicator lamp 58 lights up. Therefore, when the alarm indication of a line fault is performed in the receiver 10, the mid-point line monitoring devices 14 which are connected in the line extended from the receiver 10 via the beginning/end line monitoring device 12 is checked. Thus, it is possible to easily known whether a line fault occurs in the cable 15a or the cable 15b, based on the lighting of the fault indicator lamp 56 or 58 shown in FIG. 2. FIG. 3 is a view showing the appearance of the beginning/end line monitoring device 12 in FIG. 1. In FIG. 3, two cables 15a and 15b are extended from the right side of a housing box of the beginning/end line monitoring device 12. The cable 15a is connected to the beginning terminals and the cable 15b to the end terminals. On the upper face of the box, the beginning fault indicator lamp 107 is disposed in the cable 15a side, and the end fault indicator lamp 117 is disposed in the cable 15b side.

A cable 13 which is connected to the receiver 10 is connected to the side of the box opposite to the side to which the cables 15a and 15b are connected. The representative fault indicator lamp 129 is disposed in the cable 13 side. In the beginning/end line monitoring device 12, the beginning fault indicator lamp 107 lights up when a short circuit occurs in the cable 15a in the beginning terminal side, and the end fault indicator lamp 117 lights up when a short circuit occurs in the cable 15b in the end terminal side. In both the cases, the representative fault indicator lamp 129 lights up. Also, in this case, the lights 107, 117 and 129 can be stored in the housing box.

When a short circuit in the beginning or end terminal side is detected, the beginning and end fault indicator lamps 107 and 117 light up. Also when a voltage cannot be detected after a predetermined time has elapsed from the power supply from the opposite side, the beginning and end fault indicator lamps 107 and 117 light up so as to indicate a line fault. Specifically, each of the short-circuit detectors 32 and 34 respectively disposed in the beginning and end terminal sides conducts the detection of a drop of the source voltage in addition to the short-circuit detection. By the detection of a drop of the source voltage, a breakage of the lines for the terminals. In other words can be detected, the short-circuit detectors 32 and 34 have a function of detecting a short circuit and also that of detecting a breakage of the lines.

When the beginning/end line monitoring device 12 shown in FIG. 3 is so constructed that the representative fault indicator lamp 129 lights up only in the case of a short-circuit detection and does not light up in the case of a detection of a line voltage drop, i.e., in the case of a line-breakage detection, therefore, it is possible to identify whether a line fault in the cable 15a or 15b side is a short circuit or a line breaking. It will be appreciated that the monitoring device may be so constructed that, conversely, the representative fault indicator lamp 129 does not light up in the case of a short-circuit detection but lights up only in the case of a line-breakage detection. Also in this case, it is possible to identify whether the line fault is a short circuit or line breakage.

In the configuration wherein the beginning/end line monitoring device 12 and the mid-point line monitoring device 14 having the fault indicator lamps and shown in FIGS. 2 and 3 are used, when a short circuit occurs at the beginning A, the end B, or the middle zone C shown in FIG. 1, the respective fault indicator lamps disposed in the beginning/end line monitoring device 12 and the mid-point line monitoring devices 14-1 to 14-3 are checked. Thus, the zone in which the line fault occurs can be easily specified, and a rapid restoration operation can be performed. In FIG. 1, the beginning/end line monitoring device 12 is externally attached to the receiver 10. Alternatively, the beginning/end line monitoring device 12 may be disposed inside the receiver 10.

2. Embodiment of a mid-point line monitoring device

Figure 4:
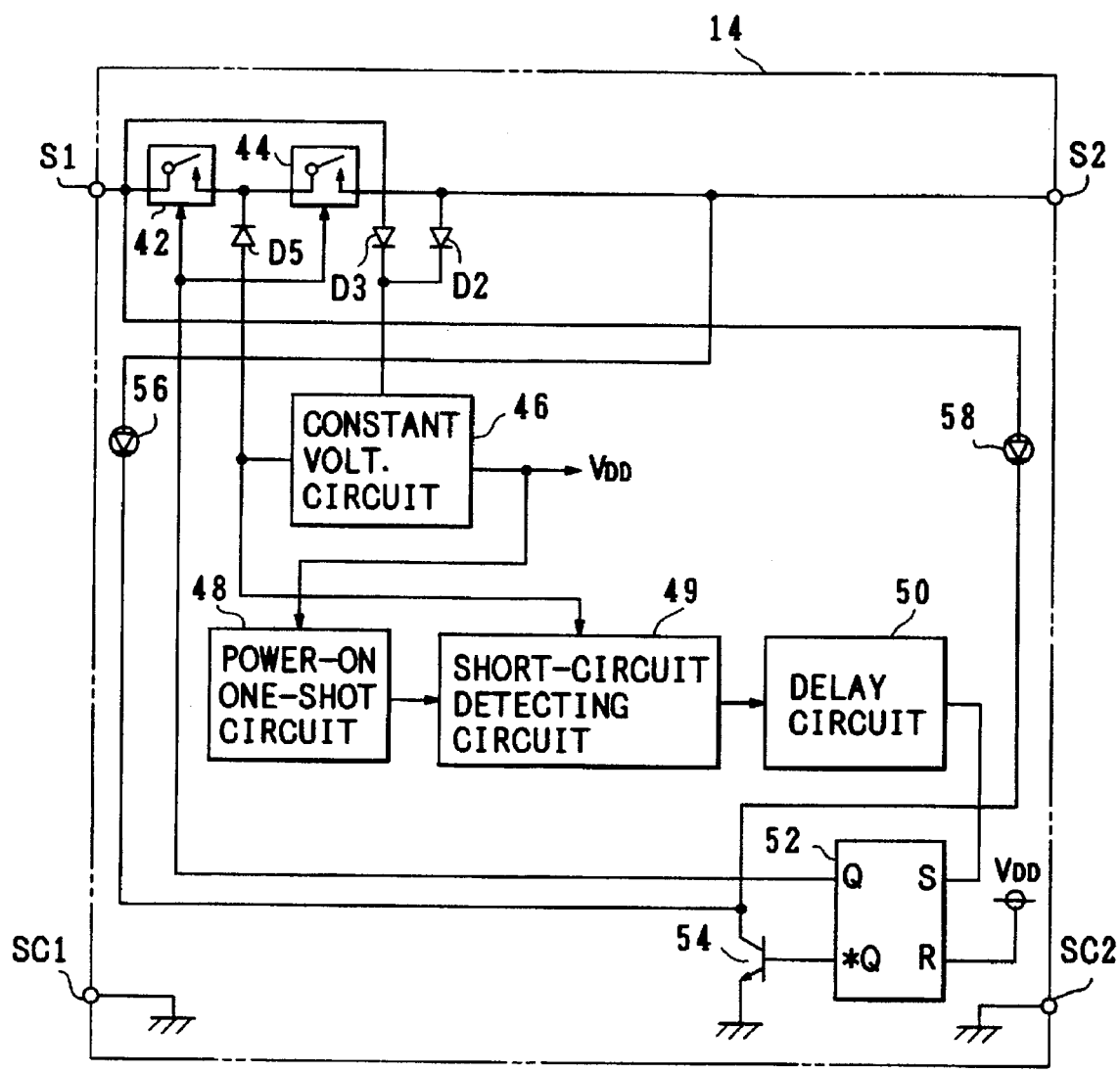
FIG. 4 is a block diagram showing an embodiment of the mid-point line monitor.
Figure 5:
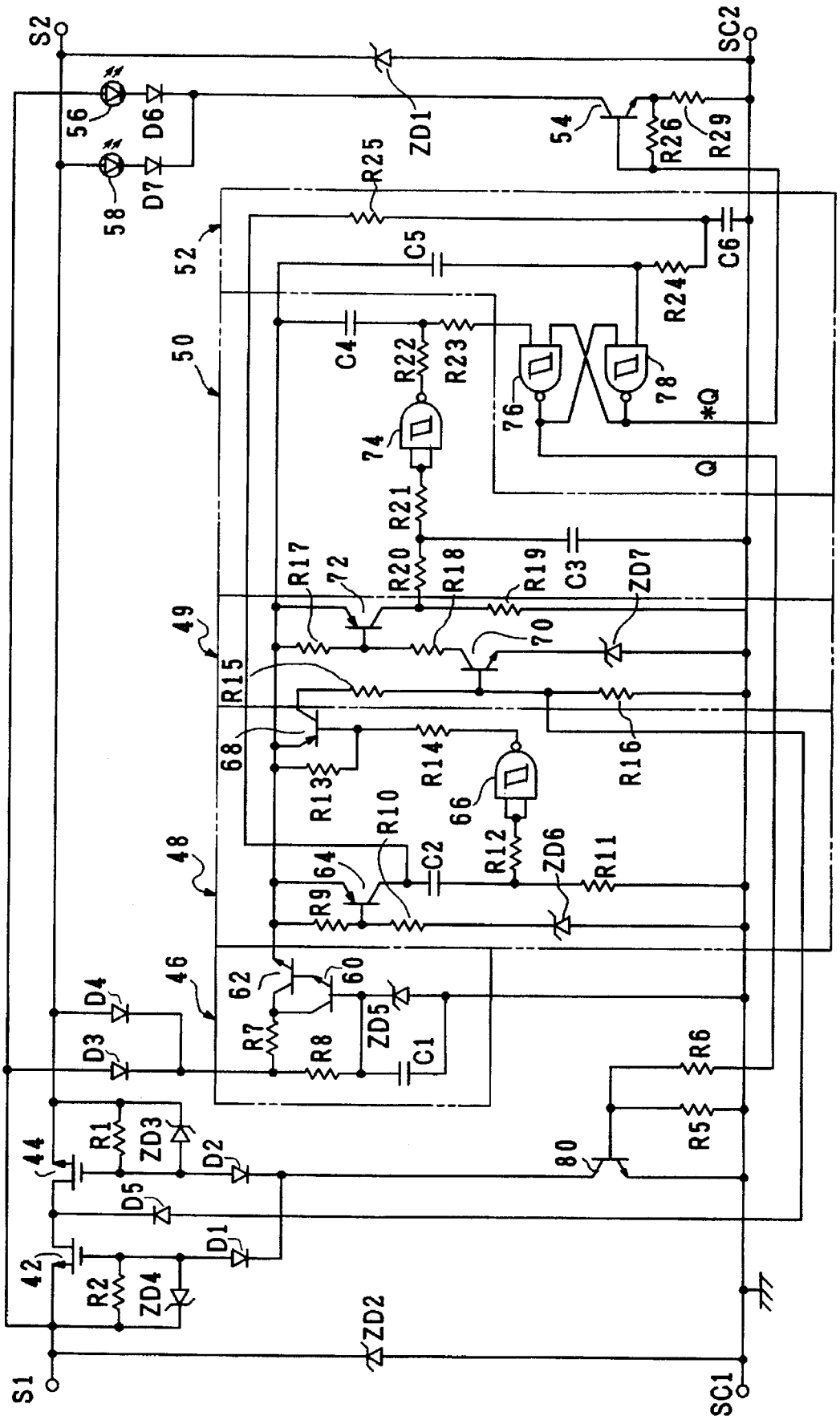
FIG. 5 is a circuit diagram showing a specific example of the embodiment of FIG. 4.

FIG. 4 is a block diagram showing in detail a circuit of a mid-point line monitoring device according to the invention, and FIG. 5 shows a specific circuit diagram of the device. In FIG. 4, the mid-point line monitoring device 14 is provided with terminals S1 and SC1 in the left side, and with terminals S2 and SC2 in the right side. In the plus power source line connecting the terminal S1 to the terminal S2, a series circuit of two FETs 42 and 44 functioning as the switch 22 in FIG. 1 is connected.

The terminals S1 and S2 are connected to a constant voltage circuit 46 via diodes D2 and D3, respectively. Accordingly, in both cases where the power supply is conducted across the terminals S1 and SC1 or across the terminals S2 and SC2, the power can be supplied to the constant voltage circuit 46. The constant voltage circuit 46 generates a source voltage $V_{DD}$ for the internal circuits.

The source voltage from the constant voltage circuit 46 is supplied to a power-ON one-shot circuit 48. When the source voltage rises to a specified voltage, the power-ON one-shot circuit 48 outputs a one-shot pulse to a short-circuit detecting circuit 49. The short-circuit detecting circuit 49 performs the short-circuit detecting operation during the input period of the one-shot pulse. The short-circuit detecting circuit 49 is connected to the FETs 42 and 44 via a diode D5. When viewed from the diode D5, the FETs 42 and 44 are regarded as diodes in which the terminals S1 and S2 function as the anode. Therefore, the load resistance in the terminal S1 or S2 side to which the power is not supplied can be detected. If the load resistance is 500 Ω or more, for example, it is judged to be normal, and, if the load resistance is less than 500 Ω, it is judged that there occurs a short circuit.

If a short circuit is not detected by the short-circuit detecting circuit 49, the one-shot pulse is passed therethrough as it is, and then applied to a set terminal S of a latch circuit 52 via a delay circuit 50. When the one-shot pulse from the delay circuit 50 is received at the set terminal S, the latch circuit 52 performs the latch operation to produce a latch output Q. The latch output Q is applied to the FETs 42 and 44, thereby turning ON the FETs 42 and 44.

In the detection operation in response to the one-shot pulse, when a short circuit occurs in the lines in the terminal side to which the power is to be supplied, the short-circuit detecting circuit 49 detects the short circuit, and inhibits the one-shot pulse from being output to the delay circuit 50, so that the latch circuit 52 cannot perform the set operation using the one-shot pulse. Since the output *Q ("*" indicates an inversion of Q) is ON, a transistor 54 is turned ON when the source voltage $V_{DD}$ from the constant voltage circuit 46 rises to a specified voltage. The fault indicator lamps 56 and 58 are connected to the collector of the transistor 54. The fault indicator lamp 56 is supplied with power through the terminal S2, and the fault indicator lamp 58 is supplied with power through the terminal S1. Accordingly, if a short circuit occurs in the terminal S2 side when the power is supplied to the terminal S1, for example, the fault indicator lamp 58 lights up to indicate the line fault in the terminal S2 side. Conversely, if a short circuit occurs in the terminal S1 side when the power is supplied to the terminal S2, the fault indicator lamp 56 lights up.

In the specific circuit diagram of FIG. 5, the plus lines in the side of the terminals S1 and S2 are commonly connected to the constant voltage circuit 46 via the diodes D3 and D4. The constant voltage circuit 46 includes resistors R7 and R8, a capacitor C1, a zener diode ZD5, and transistors 62 and 60. The power-ON one-shot circuit 48 includes transistors 64 and 68, a NAND gate 66 functioning as an invertor, resistors R9 to R14, a capacitor C2, and a zener diode ZD6.

When the output voltage from the constant voltage circuit 46 exceeds a voltage determined by the zener diode ZD6, the transistor 64 is turned ON. As a result of the turning ON of the transistor 64, a differential circuit in which the capacitor C2 and the resistor R11 are connected in series generates a differential pulse. The differential pulse is transformed into a rectangular one-shot pulse by the wave shaping in the NAND gate 66, thereby conducting a one-shot driving on the transistor 68.

The short-circuit detecting circuit 49 includes transistors 70 and 72, resistors R15 to R19, and a zener diode ZD7. The base of the transistor 70 is connected to the FETs 42 and 44 via a diode D5 so as to be connected to the impedance of the load side. Upon receiving the one-shot pulse being generated by the one-shot operation of the transistor 68 in the power-ON one-shot circuit 48, when the load impedance is not in the short-circuit state, i.e., is 500 Ω or more, the transistor 70 is normally turned ON, and then the transistor 72 is turned ON, so that the one-shot pulse is output to the delay circuit 50.

When the impedance in the load side connected via the diode D5 is less than 500 Ω, the transistor 70 cannot be turned ON by the one-shot pulse and the transistor 72 is turned OFF. Thus, the one-shot pulse is inhibited from being output to the delay circuit 50. The delay circuit 50 including a NAND gate 74 functioning as an invertor, resistors R20 to R23, and capacitors C3 and C4. The delay dime is determined by the time constant of a combination of the resistor R20 and the capacitor C3.

The latch circuit 52 is constructed as a flip-flop using NAND gates 76 and 78, and includes a reset circuit in which a resistor R25 and a capacitor C6 are connected in series in the NAND gate 78 side. The reset circuit changes the initial reset in response to the turning ON of the transistor 64 in the power-ON one-shot circuit 48. In addition, a capacitor C5 is provided for the purpose of noise absorption.

The Q output of the latch circuit 52 is applied to the base of a transistor 80 to which resistors R5 and R6 are connected, so as to drive the FETs 42 and 44. The gates of the FETs 42 and 44 are connected to the transistor 80 so that the FETs functions as a collector load of the transistor. A gate circuit which includes resistors R1 and R2, diodes D1 and D2, and zener diodes ZD3 and ZD4 is connected to the gates of the FETs 42 and 44.

The *Q output of the latch circuit 52 is supplied to the base of a transistor 54 to which resistors R26 and R29 are connected. To the collector of the transistor 54, two LEDs which respectively realize the fault indicator lamps 56 and 58 are connected in parallel via diodes D6 and D7. In addition, zener diodes ZD1 and ZD2 for absorbing noise are connected between the terminals S1 and SC1 and between the terminals S2 and SC2, respectively.

Figure 6:
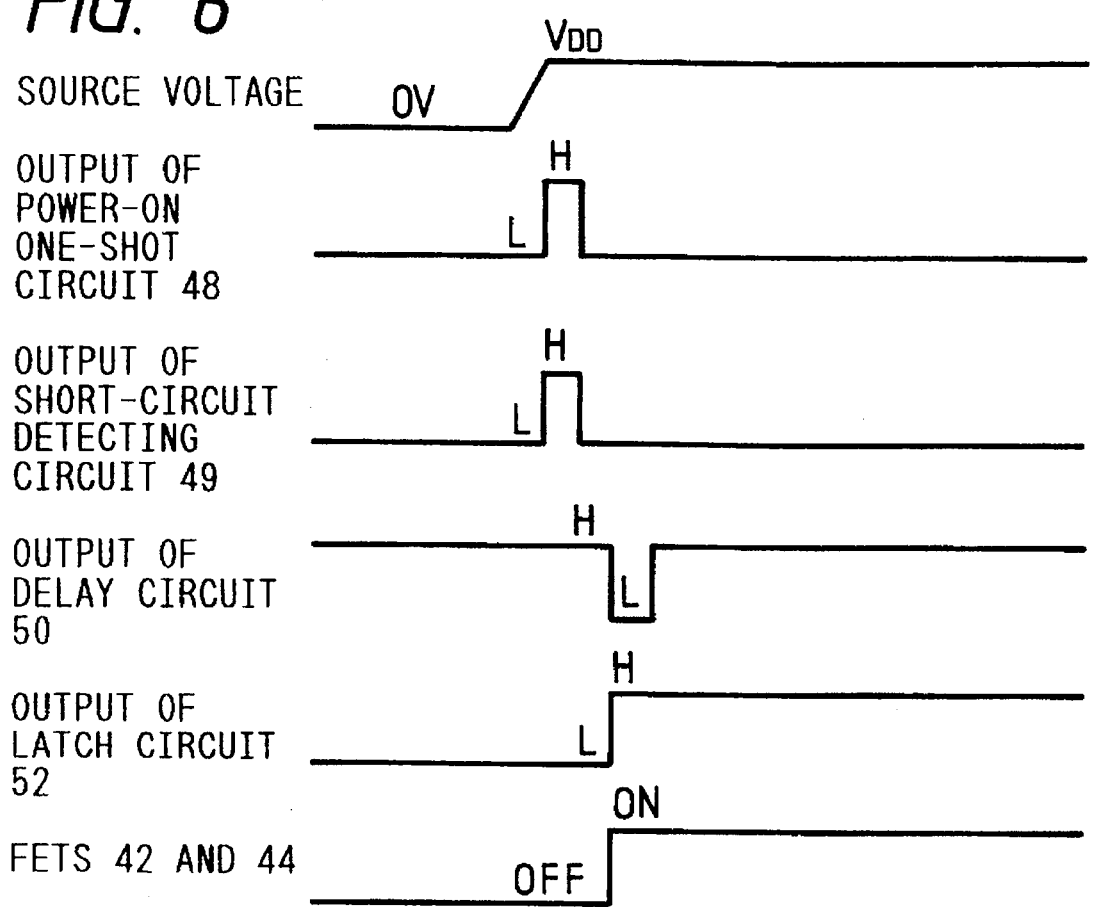
FIG. 6 is a signal waveform chart showing the power supply operation in the line normal state in the mid-point line monitor of FIG. 4.

FIG. 6 is a signal waveform chart illustrating the power-ON operation in the normal state in the mid-point line monitoring device shown in FIGS. 4 and 5. When the source voltage is applied and the voltage rises to the specified source voltage $V_{DD}$, the power-ON one-shot circuit 48 outputs the one-shot pulse. Since the lines are normal, the one-shot pulse is output from the short-circuit detecting circuit 49 to the delay circuit 50. After it is delayed by a given time $T_0$ in the delay circuit 50, the latch operation is performed by the latch circuit 52, and the FETs 42 and 44 in the side of the terminals S1 and S2 to which the power is to be supplied are turned ON.

Figure 7:
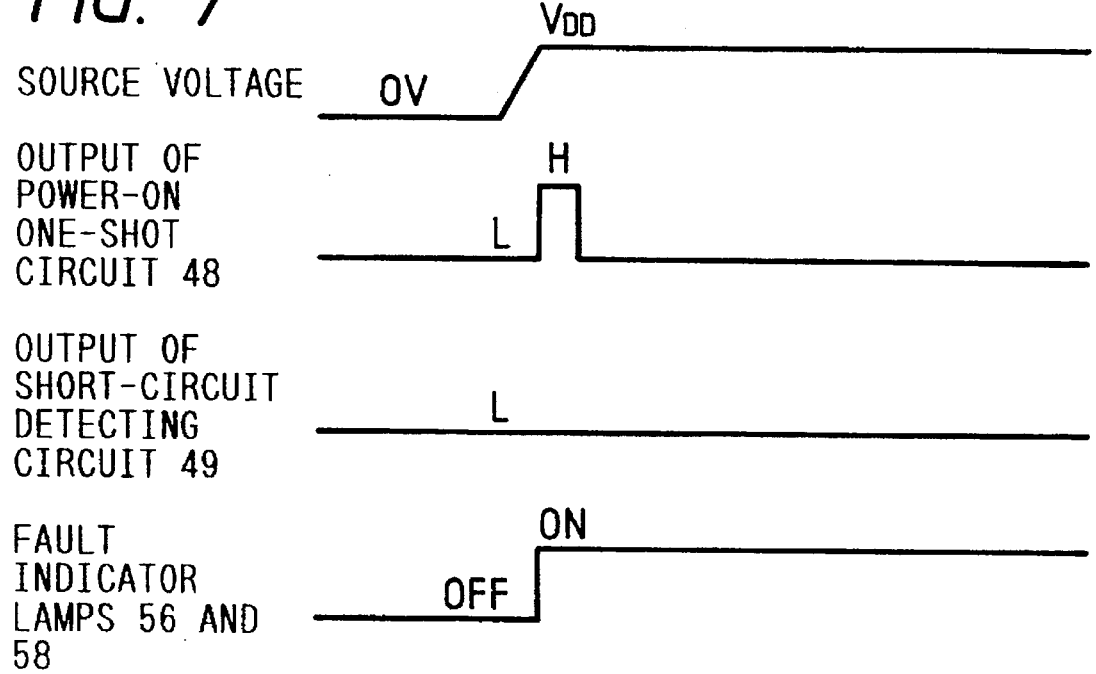
FIG. 7 is a signal waveform chart showing the power supply operation in the line short-circuit state in the mid-point line monitor of FIG. 4.

FIG. 7 is a signal waveform chart illustrating the operation in the case where a short circuit occurs in a signal line in the side of the terminals to which the power is to be supplied. In this case, even when the source voltage rises to the specified voltage and the one-shot pulse is generated, the detection of the short-circuit inhibits the one-shot pulse from being output from the short-circuit detecting circuit 49. Therefore, the turning ON of the FET 42 or 44 based on the latch operation of the latch circuit 52 is not performed, and the *Q output of the latch circuit causes the fault indicator lamp 56 or 58 in the terminal side in which the short circuit occurs, to light up.

3. Embodiment of the beginning/end line monitoring device

Figure 8:
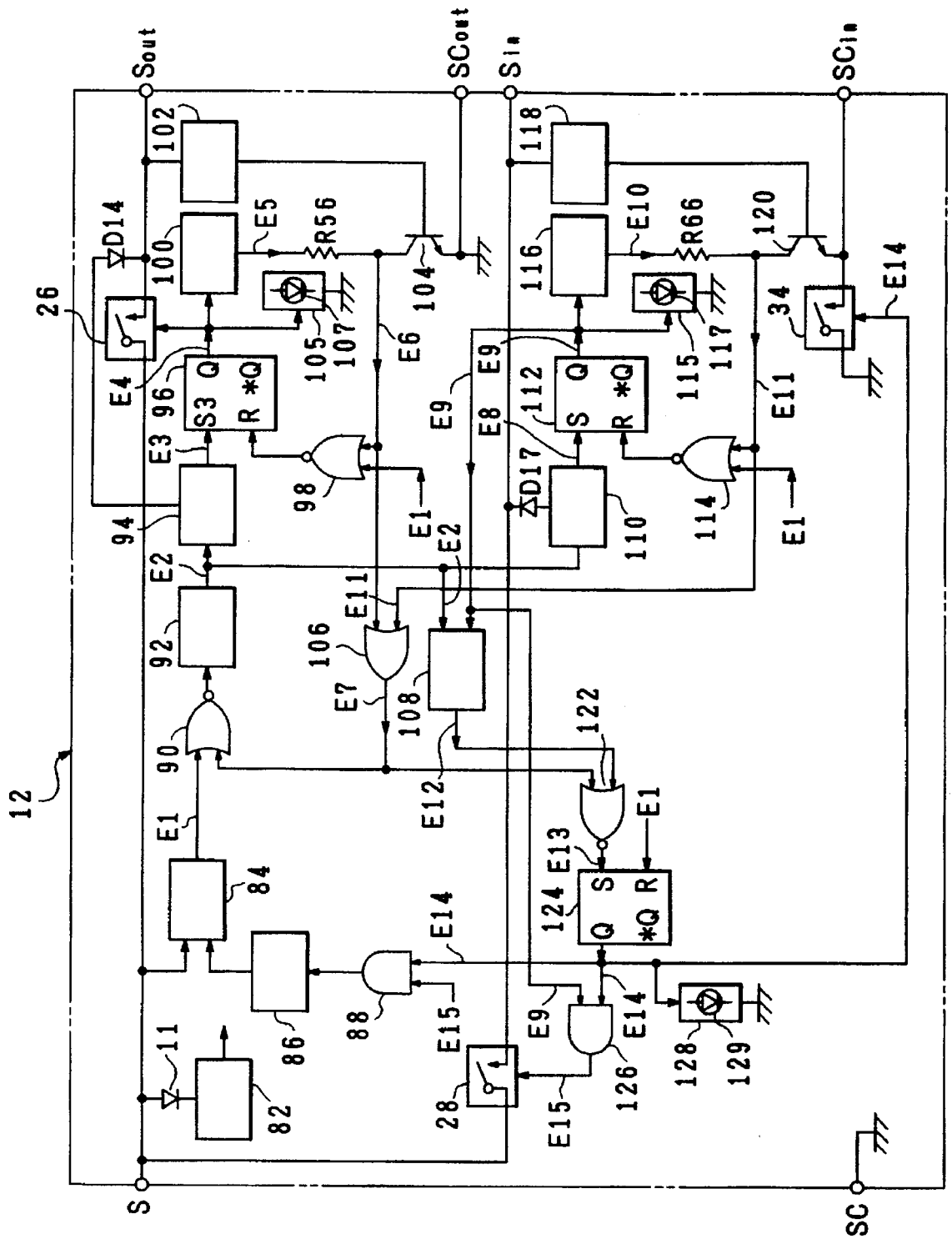
FIG. 8 is a block diagram showing an embodiment of the beginning/end line monitor.
Figure 9:
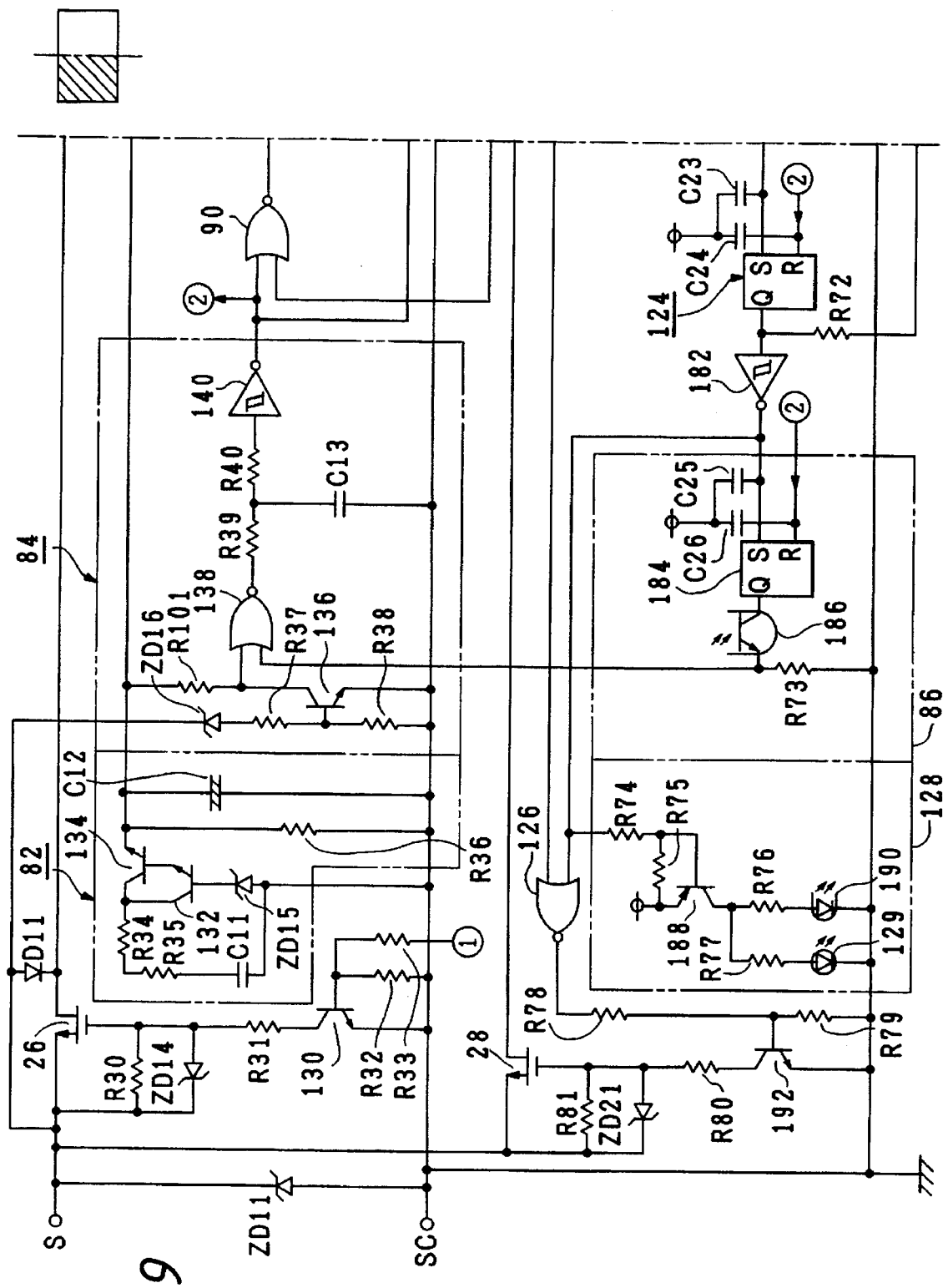
FIG. 9 is a circuit diagram showing a specific example of the embodiment of FIG. 8.
Figure 10:
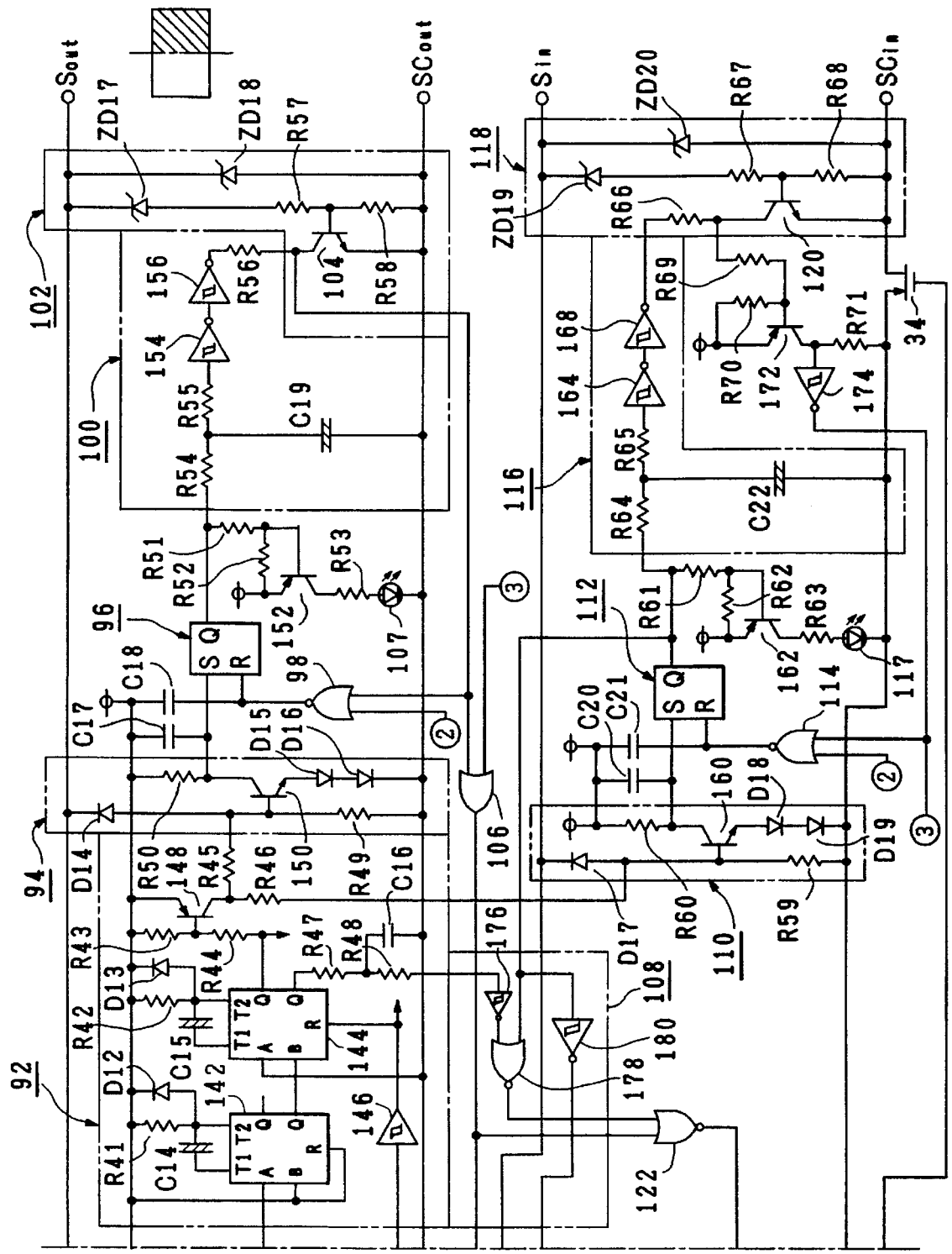
FIG. 10 is a circuit diagram showing the specific example of the embodiment of FIG. 8 and continued from FIG. 9.

FIG. 8 is a block diagram showing an embodiment of the beginning/end line monitoring device according to the invention, and shows the circuit portion 12a indicated by the broken line in FIG. 1, and FIGS. 9 and 10 show the specific circuit diagram of the monitoring device. In FIG. 8, the beginning/end line monitoring device 12 has terminals S and SC in the receiver side, and beginning terminals Sout and SCout and end terminals Sin and SCin in the terminal device side. A constant voltage circuit 82 is connected via a diode D11 to the terminal S in the receiver side which is connected to the plus side of the power source. The constant voltage circuit 82 generates a source voltage $V_{DD}$ for the internal circuits.

A reset circuit 84 is connected to the terminal S. When the source voltage is applied across the terminals S and SC, the reset circuit 84 outputs a reset signal E1. In the period other than the power supply period, the reset circuit 84 may be forcedly caused to generate the reset signal E1 by an external reset circuit 86 which is activated by an output of an AND gate 88. To the AND gate 88, input are an external reset signal E15 from the receiver and a line fault signal E14 from an RS-FF 124 which will be described later. When the external reset signal E15 is supplied from the receiver while a line fault occurs, the reset circuit 84 is caused to operate by the external reset circuit 86.

The reset signal E1 from the reset circuit 84 is input to a power-ON one-shot circuit 92 via a NOR gate 90. The power-ON one-shot circuit 92 outputs a one-shot pulse E2 having a pulse width of T2 after a predetermined time T1 has elapsed from the reset timing due to the reset signal E1. The time T1 is previously determined by the operation time period depending on the number of mid-point line monitoring devices which are loop-connected in the terminal device side. The one-shot pulse E2 is output in a parallel manner to short-circuit detecting circuits 94 and 110 in the beginning terminal side and in the end terminal side.

First, the beginning terminal side will be described. The short-circuit detecting circuit 94 is connected to the terminal Sour via a diode D14. When the load impedance is 500 Ω or more, the short-circuit detecting circuit 94 judges that the lines are normal, and, when the load impedance is less than 500 Ω, the circuit judges that a short circuit occurs. In the normal case, the one-shot pulse is output as it is, as a signal E3. In the case where a short circuit is detected, the one-shot pulse is inhibited from being output.

Next to the short-circuit detecting circuit 94, an RS-FF 96 is disposed. The RS-FF 96 is reset by the reset signal E1 supplied through a NOR gate 98, and then the output is inverted by a falling of the one-shot pulse E3 supplied from the short-circuit detecting circuit 94 to the terminal S3 in the normal case, so that Q=H and *Q=L. When Q=H, the Q output signal E4 of the RS-FF 96 turns ON the switch 26 using an FET.

A delay circuit 100 is connected to the Q output of the RS-FF 96. The delay circuit 100 outputs a delay signal E5 which is obtained by delaying the Q output signal E4 of the RS-FF 96 by a predetermined time T3. The Q output signal E4 of the RS-FF 96 is supplied to an alarm indicator circuit 105. When the Q output signal E4 is at L level while the voltage rises to the source voltage $V_{DD}$ according to a short circuit detection by the short-circuit detecting circuit 94, the beginning fault indicator lamp 107 which indicates a line fault in the lines in the side of the beginning terminals Sout and SCout lights up.

A voltage detecting circuit 102 judges whether the voltage applied across the terminals Sout and SCout has the specified voltage or not. When the voltage becomes equal to or higher than the specified voltage so as to detect the normal voltage, a transistor 104 is turned ON. If the transistor 104 is turned ON by the normal voltage detection, the delay signal E5 from the delay circuit 100 is pulled down so that a signal E6 becomes L. In contrast, when the voltage is lower than the specified voltage and the normal voltage is not detected, the transistor 104 is turned OFF. In this case, the delay signal E5 from the delay circuit 100 is output as the line fault signal E6. The line fault signal E6 generated when the voltage detecting circuit detects a voltage drop is used for resetting the RS-FF 96 via the NOR gate 98, and output as a line voltage drop signal E7 via an OR gate 106. The line voltage drop signal E7 is supplied to the power-ON one-shot circuit 92 via the NOR gate 90 to retrigger the circuit.

Furthermore, the line voltage drop signal E7 is supplied as a signal E13 via a NOR gate 122 to an RS-FF 124 for representative fault detection, to perform the set operation of the RS-FF 124. Thus, the Q output is made to be H, so that a representative fault signal E14 is output. The representative fault signal E14 causes the representative fault indicator lamp 129 of a fault indicator circuit 128 to light up, and a switch 34 using an FET which is connected in series to the terminal SCin in the end side to be turned ON.

The representative fault signal E14 is input also to one input of an AND gate 126. To the other input of the AND gate 126, the Q output signal E9 of an RS-FF 112 disposed in the end terminal side is input. The Q output signal E9 is at H level in the normal case in which a short circuit does not occur in the end terminal side, so that the AND gate 126 is in the allowable state. At this time, if the representative fault signal E14 is obtained based on the line voltage drop signal E7 indicative of the line fault in the beginning terminal side, an output signal E15 of the AND gate 126 becomes H, so as to turn ON a switch 28. When the switches 28 and 34 are turned ON as a result of the fault detection in the beginning terminal side, the power is supplied through the terminals Sin and SCin in the end terminal side.

Next, the circuit in the end terminal side and in the next stage of the power-ON one-shot circuit 92 will be described. In the same manner as the beginning terminal side, the short-circuit detecting circuit 110, the RS-FF 112, a fault indicator circuit 115, a delay circuit 116, and a voltage detecting circuit 118 are disposed. The short-circuit detecting circuit 110 is connected to the terminal Sin via a diode D17. When the line impedance is 500 Ω or more, the short-circuit detecting circuit 118 judges that the lines are normal. When the load impedance is less than 500 Ω, the circuit judges that a short circuit occurs, and the one-shot pulse is inhibited from passing therethrough.

The RS-FF 112 is reset by the reset signal E1. The RS-FF 112 is set by the one-shot pulse E8 when a short circuit is not detected in the end terminal side by the short-circuit detecting circuit 110, so that the Q output signal E9 is made H. The delay circuit 116 outputs a delay signal E10 after the predetermined time T3. The fault indicator circuit 115 has the end fault indicator lamp 117. The end fault indicator lamp 117 lights up, when the Q output signal E9 of the RS-FF 112 is L as a result of the short-circuit detection by the short-circuit detecting circuit 110 under the state where the voltage rises to the source voltage $V_{DD}$.

The voltage detecting circuit 118 judges whether the voltage applied across the end terminals Sin and SCin has the specified voltage or not. If the specified voltage is obtained, a transistor 120 is turned ON. If the specified voltage is not obtained, i.e., a voltage drop is detected, the transistor 120 is turned OFF. If the normal voltage is detected by the voltage detecting circuit 118, the delay signal E10 is pulled down by the transistor 120 so as not to be output.

In contrast, when the transistor 120 is turned OFF because the voltage detecting circuit 118 detects a voltage drop, the delay signal E10 is output as it is, as the line voltage drop signal E11 which resets the RS-FF 112 via the NOR gate 114. Furthermore, the signal E11 is output via the NOR gate 106 as the line voltage drop signal E7 which retriggers the power-ON one-shot circuit 92 via the NOR gate 90, and causes the RS-FF 124 to perform a latch operation for the representative fault detection.

An end short-circuit detecting circuit 108 is disposed in the end terminal side. To the end short-circuit detecting circuit 108, the one-shot pulse E2 from the power-ON one-shot circuit 92, and the Q output signal E9 of the RS-FF 112 in the end terminal side are input. If the end terminal side is normal, the Q output signal E9 is H, so that the one-shot pulse E2 is inhibited from passing the detecting circuit 108. If a short circuit occurs at the end terminal, the Q output signal E9 is made L, so that the end short-circuit detecting circuit becomes into the allowable state. The one-shot pulse E2 which is obtained at this time is output to the RS-FF 124 through the NOR gate 122, as an end short-circuit detection signal E12 which causes the RS-FF 124 to perform the latch operation for the representative fault detection.

Next, the specific circuit diagram shown in FIGS. 9 and 10 will be described. FIG. 9 is a left part of the beginning/ end line monitoring device, and FIG. 10. is a right part of the device. The constant voltage circuit 82 includes transistors 132 and 134, resistors R34 to R36, capacitors C11 and C12, and a zener diode ZD15. The constant voltage circuit 82 generates the source voltage $V_{DD}$ when the power is supplied across the terminals S and SC in the receiver side. The reset circuit 84 includes a transistor 136, a NOR gate 138, an invertor 140, resistors R37 to R40 and R101, a zener diode ZD16, and a capacitor C13. The reset circuit 84 outputs a reset signal when the power is ON, or when a reset signal from the external reset circuit 86 is input. As shown by 2 in a circle in the figures, the reset signal from the reset circuit 84 is supplied to RS-FFs 96, 112, 124, and 184.

The power-ON one-shot circuit 92 includes first and second timer circuits 142 and 144, an invertor 146, resistors R41 to R48, capacitors C14 to C16, diodes D12 and D13, and a transistor 148. The timer circuit 142 makes the Q output to be H after a time T1 has elapsed from the reception of the reset signal. The preset time T1 is determined by the time constant of a combination of the capacitor C14 and the resistor R41.

The second timer circuit 144 operates in response to the Q output from the first timer circuit 142 after the time T1, and is restored after a time T2, thereby determining the pulse width T2 of the one-shot pulse. The pulse width T2 of the one-shot pulse is preset by the time constant of a combination of the capacitor C15 and the resistor R42. The one-shot pulse from the timer circuit 144 turns ON the transistor 148, and is output to the succeeding short-circuit detecting circuit 94.

The short-circuit detecting circuit 94 includes a transistor 150, resistors R49 and R50, and diodes D15 and D16. The base of the transistor 150 is connected to the line of the terminal Sout in the end terminal side via the diode D14. When the line in the end terminal side is normal, the transistor 150 is turned ON in response to an input of the one-shot pulse. In contrast, when the impedance is low due to the short circuit occurring in the lines in the end terminal side, the transistor 150 cannot be turned ON even by an input of the one-shot pulse. Accordingly, the one-shot pulse is inhibited from being output to the succeeding RS-FF 96.

Next to the short-circuit detecting circuit 94, the RS-FF 96 is disposed, and thereafter the delay circuit 100 is disposed. The delay circuit 100 includes invertors 154 and 156, resistors R54 to R56, and a capacitor C19. The delay time T3 is determined by the time constant of a combination of the resistor R54 and the capacitor C19. In the output side of the RS-FF 96, a fault indicator circuit for the beginning fault indicator lamp 107 is disposed. The fault indicator circuit includes a transistor 152 and resistors R51 to R53.

The voltage detecting circuit 102 includes a transistor 104, a zener diode ZD17, and resistors R57 and R58. For example, when a voltage of 15 V or higher is detected, it is judged that a normal voltage is applied, and, when a voltage lower than 15 V is detected, it is judged that a voltage drop occurs. When a normal voltage is detected, the transistor 104 is turned ON, and, when a voltage drop is detected, the transistor 104 is turned OFF. Furthermore, as shown by 1 in a circle in FIGS. 9 and 10, the Q output of the RS-FF 96 is connected to a driving circuit for the FET 26 shown in the left side of the constant voltage circuit 82. The driving circuit for the FET 26 includes a transistor 130, resistors R30 to R33, and a zener diode ZD14. Next, the side of the beginning terminals Sin and SCin will be described. The short-circuit detecting circuit 110 includes a transistor 160, resistors R59 and R60, and diodes D17 and D19. The base of the transistor 160 is connected to the line in the end terminal Sin side via a diode D17. Next to the short-circuit detecting circuit 110, the delay circuit 116 is disposed via the RS-FF 112.

The delay circuit 116 includes invertors 164 and 168, resistors R64 and R65, and a capacitor C22. The delay time T3 is determined by the time constant of a combination of the resistor R64 and the capacitor C22. In the output side of the RS-FF 112, a fault indicator circuit for the end fault indicator lamp 117 is disposed. The fault indicator circuit includes a transistor 162, and resistors R61 to R63. The voltage detecting circuit 118 includes a transistor 120, resistors R66 to R68, and a zener diode ZD19. For example, when a voltage of 15 V or higher is detected, it is judged that a normal voltage is applied, and, when a voltage lower than 15 V is detected, it is judged that a voltage drop occurs. When a normal voltage is detected, the transistor 120 is turned ON, and, when a voltage drop is detected, the transistor 120 is turned OFF.

The end detecting circuit 108 includes an invertor 174, 176 and 180, and a NOR gate 178, and outputs an end detection signal to a NOR gate 122. The end detecting circuit 108 includes an invertor 180 for inverting the Q output of the RS-FF 112 and for outputting the inverted signal to the NOR gate 126 as the line fault signal. The Q output of the representative fault RS-FF 124 is applied via a resistor R72 to the gate of the FET 34 disposed in a line from the end terminal SCin. The Q output of the RS-FF 124 as the representative fault signal is inverted by the invertor 182, and then supplied to the NOR gate 126. The output of the NOR gate 126 is supplied to a driving circuit for the FET 28 which supplies the power to the end terminal Sin. The driving circuit includes a transistor 192, resistors R78 to R81, and a zener diode ZD21.

The representative fault signal which has been output as the Q output of the RS-FF 124 and inverted by the invertor 182 is supplied to the fault indicator circuit 128 which includes a transistor 188, resistors R74 to R77, a light emitting portion 190 of a photo coupler, and the representative fault indicator lamp 129. The light from the light emitting portion 190 of a photo coupler is received by a light receiving portion of a photo coupler which is not shown, so that the line fault signal is sent to the receiver 10.

The external reset circuit 86 includes an RS-FF 184, a light receiving portion 186 of a photo coupler, a resistor R73, and capacitors C25 and C26. The light from an emitting portion of the photo coupler which is driven by the receiver is incident on the light receiving portion 186. The incident light functions as the external reset input from the receiver. That is, when the external reset input to the light receiving portion 186 is obtained from the receiver, and the representative fault output is obtained from the RS-FF 124, the forcedly resetting input for the reset circuit 84 can be applied.

Zener diodes ZD11, ZD18, and ZD20 for noise absorption are connected between the receiver-side terminals S and SC, between the beginning terminals Sout and SCout, and between the end terminals Sin and SCin, respectively.

4. Operation of the beginning/end line monitoring device

Next, the operation of the beginning/end line monitoring device 12 shown in FIGS. 8, 9, and 10 will be described. The operation of the beginning/end line monitoring device 12 includes the operation when the power is turned ON, and the operation when the line voltage is dropped in the steady state after the power supply.

Figure 11:
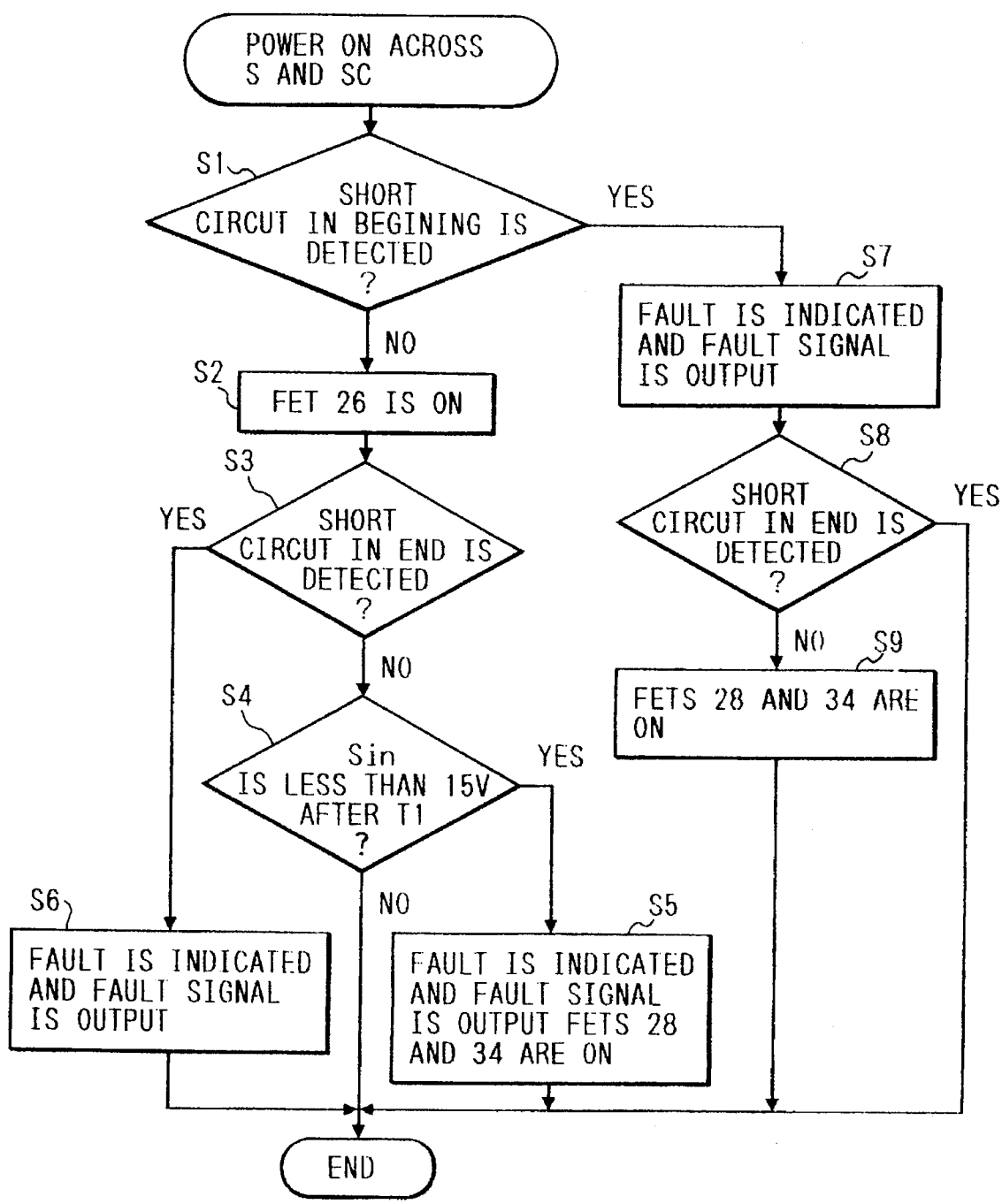
FIG. 11 is a flowchart showing the power-ON operation in the embodiment of FIG. 8.

FIG. 11 is a flowchart illustrating the power-ON operation when the power is applied across the terminals S and SC from the receiver. The power-ON start operation includes the following operations:

(1) the operation in the normal state;
(2) the operation when a short circuit occurs at the beginning terminals;
(3) the operation when a short circuit occurs at the end terminals; and
(4) the operation when a fault occurs in the loop line.

If the lines in the terminal device side are normal, the power supply from the receiver is checked in step S1 as to whether a short circuit is detected at the beginning side or not. Since the beginning terminal side is normal, the process step proceeds to step S2 where the FET 26 is turned ON, so that the power is supplied through the beginning terminals. Then, the process step proceeds to step S3 where it is judged whether a short circuit occurs in the end terminal side or not. Since also the end terminal side is normal, the process step proceeds to step S4 where it is checked as to whether or not the voltage is not higher than the specified voltage, e.g., 15 V. Since the condition is normal, a voltage exceeding 15 V can be obtained after the time T1. Thus, the series of processes are terminated. In such a normal state, only the FET 26 is turned ON, and the FETs 28 and 34 are in the OFF state.

If a short circuit at the beginning terminals is detected in step S1, the process step proceeds to step S7 where the beginning fault indicator lamp 107 and the representative fault indicator lamp 129 light up for indicating the fault, and the information of the line fault signal is transferred to the receiver. Next, in step S8, it is judged whether a short circuit occurs at the beginning terminals or not. If the end terminals are normal, the process step proceeds to step S9 where the FETs 28 and 34 are turned ON, so that the power is supplied between end terminals.

When a short circuit occurs in the end terminal side, the process step proceeds from step S1 to step S3 where the short circuit in the end terminal side is detected. Then, the process step proceeds to step S6 where the end fault indicator lamp 117 and the representative fault indicator lamp 129 light up for indicating the fault, and the information of the line fault signal is transferred to the receiver.

In the case where all the beginning and end terminals and of the line are normal but there occurs a fault in the loop lines, the voltage in the end terminal side is not higher than the specified voltage of 15 V even after the time T1 has elapsed in the state where the process step proceeds from step S1 to step S4. Therefore, the process step proceeds to step S5 where the representative fault indicator lamp 129 lights up for indicating the fault and the information of the line fault signal is transferred to the receiver. At the same time, the FETs 28 and 34 are turned ON, so that the power is supplied through the end terminals.

Figure 12:
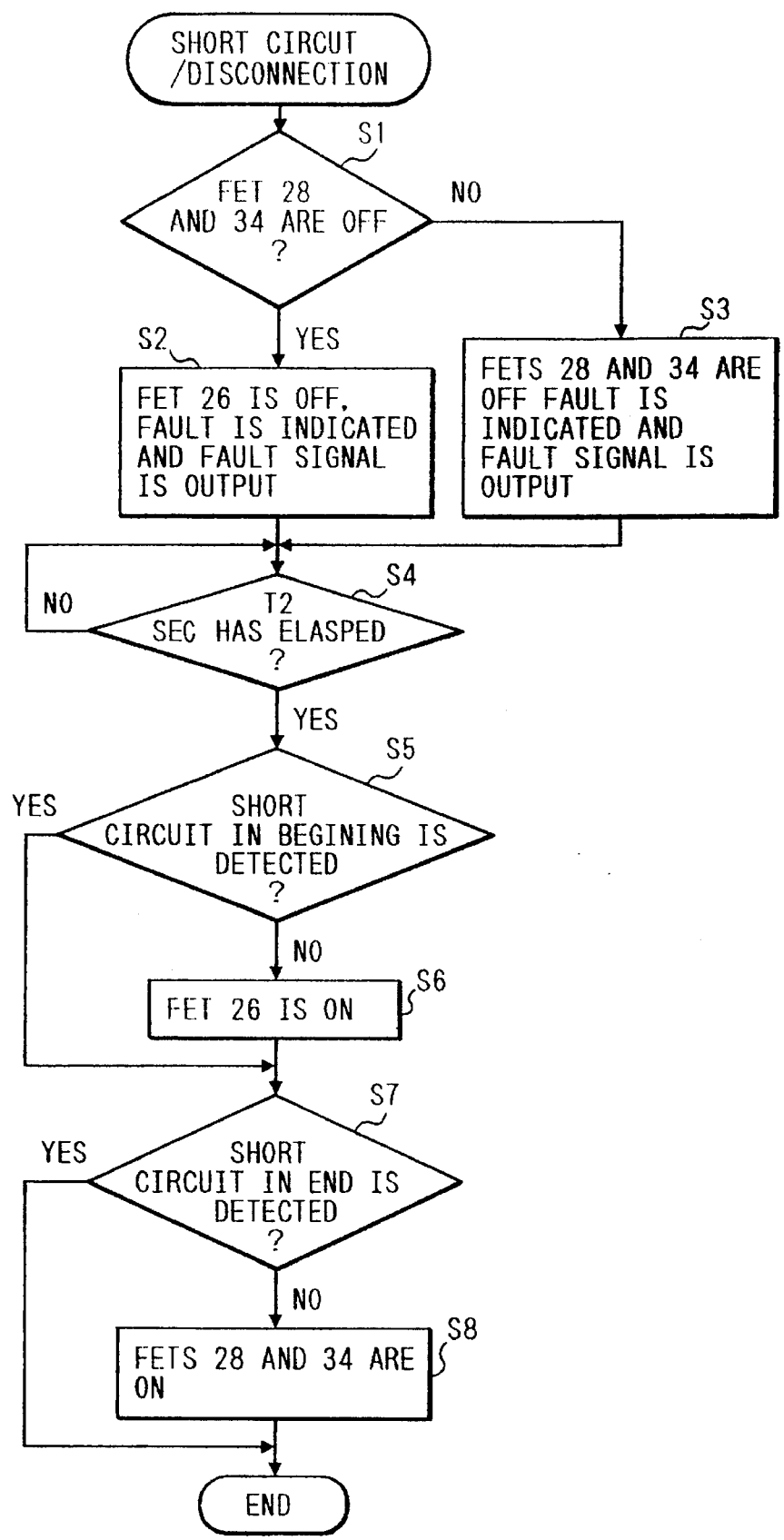
FIG. 12 is a flowchart showing the operation in the voltage drop detection in the embodiment of FIG. 8.

FIG. 12 is a flowchart illustrating the operation of the beginning/end line monitoring device 12 conducted when a short circuit or a line breakage occurs in the terminal line side under the monitoring condition in which the initial power supply is normally performed. When a short circuit or a line breakage occurs in the lines of the terminal side in the steady condition, the voltage drop is detected by the voltage detecting circuit 102 or 118. In FIG. 12, it is first checked in step S1 as to whether the FETs 28 and 34 are in the OFF state or not, i.e., whether the power is supplied through the beginning terminals or through the end terminals. Then, the fault indication by the representative fault indicator lamp 129, the information transfer of the line fault signal to the receiver, and the turning OFF of the FET 26 are performed. Then, the power supply is once cut off.

In contrast, if the FETs 28 and 34 are in the ON state in step S1 and the power is supplied through the end terminals, the fault indication and the information transfer are performed in the same manner as step S2, and then the FETs 28 and 34 which are in the ON state are turned OFF.

Next, in step S4, the elapse of time equal to the pulse width T2 of the one-shot pulse obtained by the retrigger of the power-ON one-shot circuit 92 is waited. In step S5, the detection of a short circuit in the beginning terminal side is then performed. If there is no short circuit in the beginning terminal side, the FET 26 is turned ON in step S6. If there occurs a short circuit in the beginning terminal side, it is checked in step S7 as to whether or not there occurs a short circuit in the end terminal side. If there is no short circuit in the end terminal side, the FETs 28 and 34 are turned ON in step S8, so that the power is supplied through the end terminals. If there occurs a short circuit also in the end terminal side, none of the FETs 26, 28 and 34 is turned ON.

Figure 13:
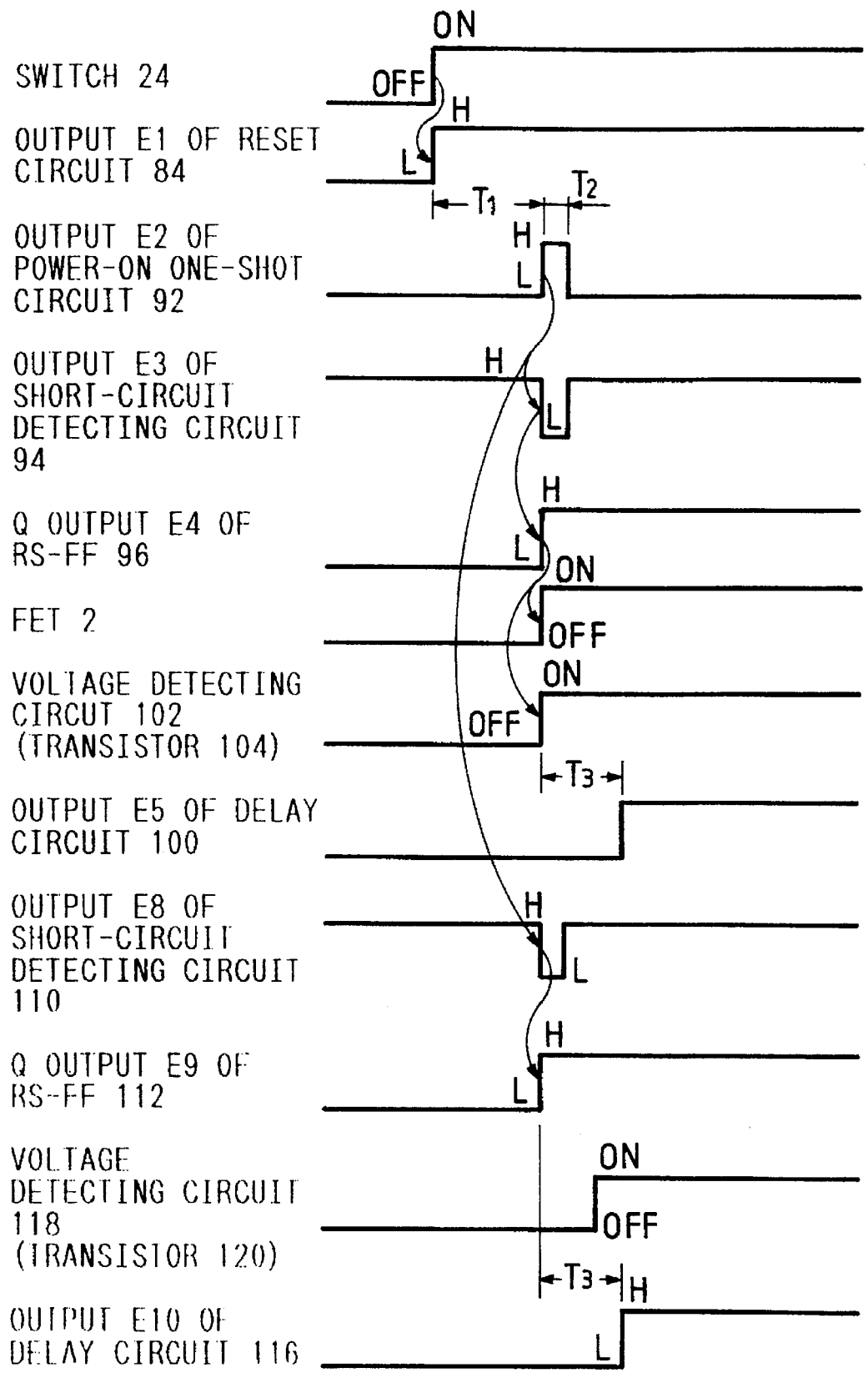
FIG. 13 is a timing chart showing the power supply operation in the line normal state in the beginning/end line monitor of FIG. 8.

FIG. 13 is a timing chart showing the power-ON start operation in the case shown in the flowchart of FIG. 11 where the lines of the terminal device side are normal. In FIG. 13, when the switch 24 shown in FIG. 1 is first turned ON at time t1 by the control signal from the receiver 10, the reset circuit 84 outputs the reset signal E1 in response to the power supply. The reset signal E1 activates the power-ON one-shot circuit 92, and the one-shot pulse E2 having the pulse width T2 is output after the given time T1 based on the time obtained by multiplying the operation time per one mid-point line monitoring device 14 by the number of the mounted number of monitoring devices 14 which are connected to the loop lines.

Since no short-circuit is detected by the short-circuit detecting circuit 94, the one-shot pulse passes as its through the circuit and is then input into the RS-FF 96. At the falling of the one-shot pulse E3, the RS-FF 96 is inverted, so that the Q output signal E4 becomes H. The rise of the Q output signal E4 to H level causes the FET 26 to be turned ON, so that the power supply through the beginning terminals is started. Since the power is supplied through the beginning terminals, the voltage detecting circuit 102 detects the normal voltage which exceeds 15 V, so that the transistor 104 is turned ON.

Accordingly, even if the delay circuit 100 outputs the delay signal E5 of the Q output signal E4 of the RS-FF 96 after the time T3, the signal is pulled down because the transistor 104 is in the ON state, so that the line voltage drop signal E6 is fixed to be L. On the other hand, the one-shot pulse is applied also to the short-circuit detecting circuit 110 in the end terminal side. Since no short-circuit is detected also in the end terminal side, the one-shot pulse is applied as it is to the RS-FF 112. As a result of the set operation of the RS-FF 112, the Q output signal E9 becomes H.

Since the mid-point line monitoring devices 14 which are connected to the lines in the terminal device side normally operate, the transistor 120 is turned ON in response to the normal voltage detection of the voltage detecting circuit 118, before the delay signal E10 of the delay circuit 116 rises to H level. Even when the delay signal E10 becomes H, therefore, the line voltage drop signal E11 is fixed to be L level which indicates the normal state, by the turning ON of the transistor 120. Thus, the FETs 28 and 34 are maintained in the OFF state.

Figure 14:
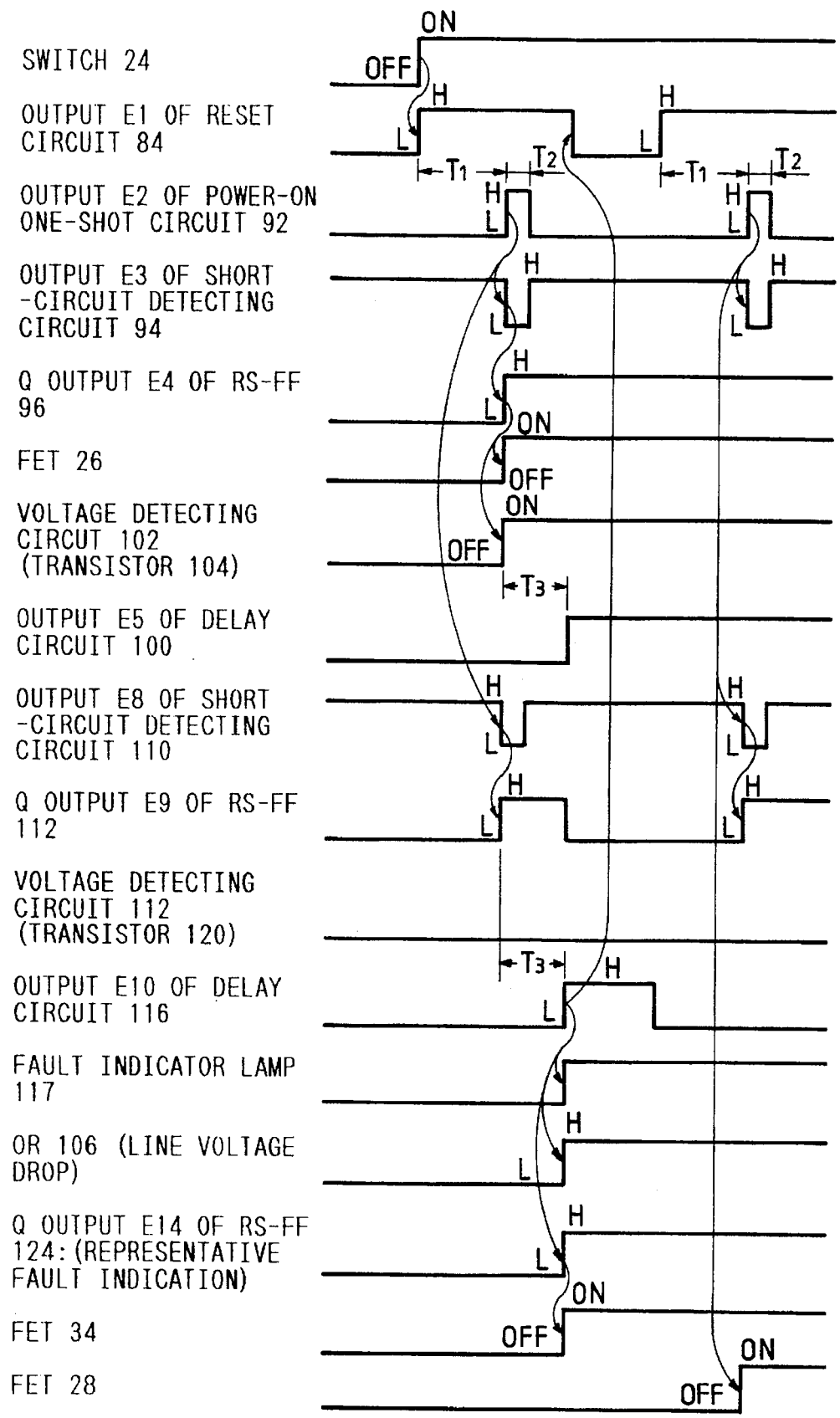
FIG. 14 is a timing chart showing the operation of the beginning/end line monitor of FIG. 8, when a short circuit or a line breakage occurs in the loop line.
Figure 15:
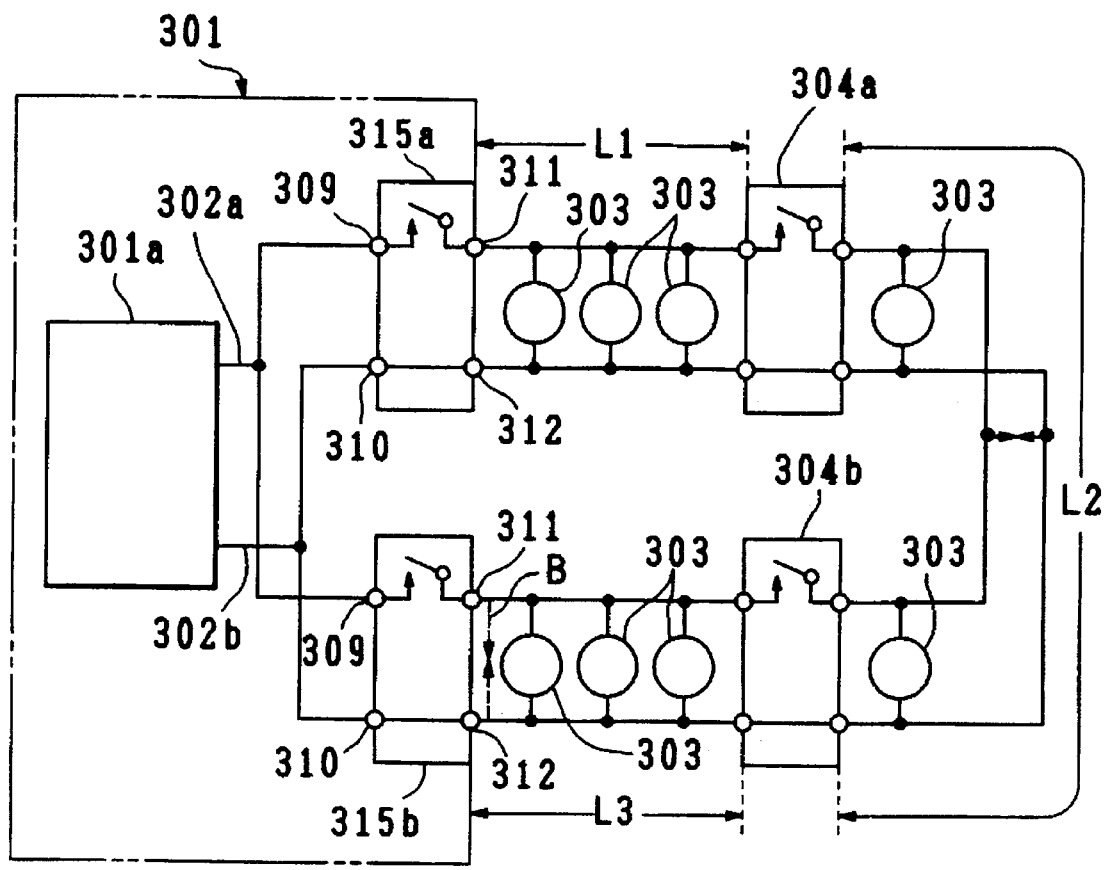
FIG. 15 is an explanation diagram of a conventional line fault monitor.
Figure 16:
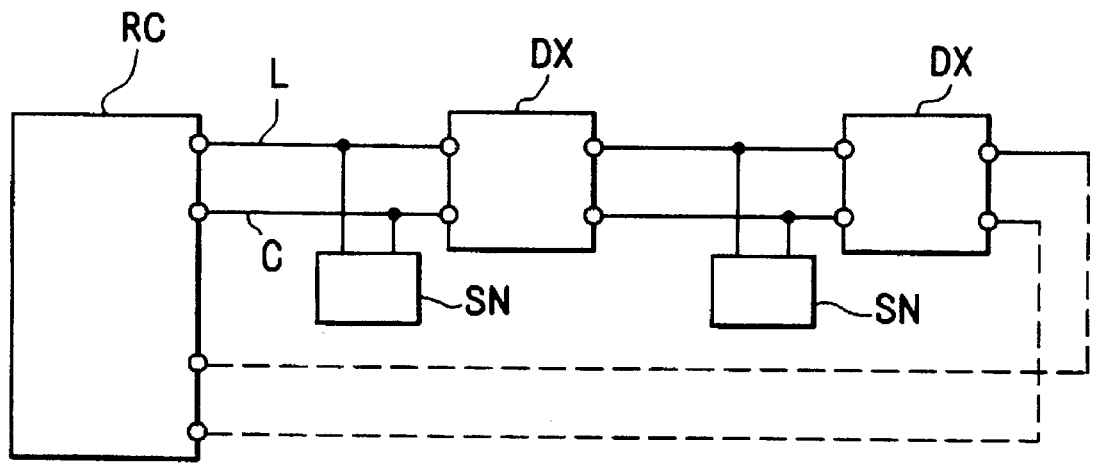
FIG. 16 is a block diagram of a conventional warning apparatus.

FIG. 14 is a timing chart showing the power-ON start operation in the case where a line breakage or a short circuit occurs at a point between adjacent ones of the mid-point line monitoring devices connected in the terminal lines. In FIG. 14, the timings from the operation of the switch 24 to the set operation of the RS-FF 112 in the end terminal side are the same as those in the case of FIG. 13. Even when the power is supplied through the beginning terminals, however, the normal voltage is not detected by the voltage detecting circuit 118 in the end terminal side because the fault exists in the terminal loop lines. Thus, the transistor 120 is maintained in the OFF state.

When the delay signal E10 from the delay circuit 116 rises to H level, therefore, the signal is output as it is, as the line voltage drop detection signal E11. When the RS-FF 112 is forcedly reset, the Q output signal E9 is made to be L. Thus, the end fault indicator lamp 117 lights up. The signal is output also as the line voltage drop signal E7 from the OR gate 106, so as to retrigger the power-ON one-shot circuit 92 via the NOR gate 90.

Moreover, the signal causes the RS-FF 124 to be operated via the NOR gate, and the representative fault signal E2 as the Q output is set to be H, so that the representative fault indicator lamp 129 lights up and at the same time the FET 34 is turned ON. The retriggered power-ON one-shot circuit 92 generates again a one-shot pulse after the time T1. At this time, the RS-FF 96 in the beginning terminal side is already in the set state, and therefore the state is not changed. In contrast, the RS-FF 112 in the end terminal side which is in the reset state becomes into the set operation in response to the one-shot pulse E8 from the short-circuit detecting circuit 110. Thus, the Q output signal E9 is again set to be H.

As a result, the end fault indicator lamp 117 which once lights up is turned out. At the same time, the Q output signal E9 becomes H and hence the signal E15 is set to be H via the AND gate 126 which becomes into the allowable state by the previously output representative fault signal E14. Thus, the FET 28 is turned ON. Accordingly, the power is supplied through the end terminals. Therefore, in the state where the line fault zone in the terminal lines is isolated by the mid-point line monitoring devices in both sides thereof, the power is supplied through both the end and beginning terminals of the beginning/end line monitoring device 12.

The operation in the case where a short circuit occurs in the beginning terminal side at the power-ON start is conducted in the same manner as that in the case shown in FIG. 14 where a line fault occurs in the terminal lines, except that the FET 26 in the beginning terminal side is not turned ON. The power supply is switched to be conducted through the end terminals.

When a short circuit occurs in the end terminal side at the power-ON start, in contrast to the normal operation in the beginning terminal side shown in FIG. 13, the one-shot pulse is inhibited from being output, by the short-circuit detecting operation of the short-circuit detecting circuit 110 in the end terminal side in which the short circuit occurs. While the RS-FF is maintained in the reset state, the end fault indicator lamp 117 is caused to light up. In response to the end short-circuit detection, the end short-circuit detection signal E12 which is synchronized with the one-shot pulse E2 is output from the end short-circuit detecting circuit 108. By the set operation of the RS-FF 124, the representative indicator lamp 129 is caused to light up. It is a matter of course that, because the set operation of the RS-FF 112 is not performed, also the end fault indicator lamp 117 lights up.

In the above embodiments, as shown in FIGS. 5, 9, and 10, the mid-point line monitoring devices 14 and the beginning/end line monitoring device 12 are constructed as analog circuits. Alternatively, the respective processes may be implemented in a program control by a CPU.

As described above, according to the invention, in a case where a line fault such as a short circuit or a line breakage occurs in lines which elongate in a loop from the receiver, the power supply is disconnected by the beginning/end line monitoring device and/or the mid-point line monitoring devices in both sides of the line fault zone. Then, the fault indicator lamp which indicates the side where the line fault occurs lights up. Thus, the zone in which the line breakage or the short circuit occurs can be easily specified, and hence the restoration operation can be rapidly performed.

Furthermore, the beginning/end line monitoring device disposed in the receiver side is provided with the fault indicator lamps for the beginning and end sides, and the representative indicator lamp. For example, they may be constructed so that, when a short circuit is detected, the representative indicator lamp lights up, and when a voltage drop is detected, the representative indicator lamp does not light up. Accordingly, it is possible to identify whether the line fault in the beginning or end terminal side is a short circuit or a line breakage.

What is claimed is:

1. A line fault monitoring apparatus comprising:

receiving means;

a signal line elongated from said receiving means and connected to said receiving means in a loop form;

power supplying means for supplying power to said signal line;

a plurality of terminals, each of said terminals for monitoring a condition and connected to said signal line for sending information based on the monitoring; and a plurality of line monitor devices which are disposed along said signal line, each particular one of said line monitor devices including fault indication means for indicating a portion of said signal line, connected to that particular one of said line monitor devices, as having a fault, said fault indication means being located in a corresponding one of said line monitor devices along said signal line;

wherein said plurality of terminals are disposed such that at least one of said terminals is interposed between adjacent ones of said line monitor devices.

2. A line fault monitoring apparatus according to claim 1, wherein each said fault indication means comprises first fault indication means for indicating that the fault occurs in a first connection side in said signal line and second fault indication means for indicating that the fault occurs in a second connection side in said signal line.

3. A line fault monitoring apparatus according to claim 2, further comprising switching means which turns on when a fault of said signal line is detected, wherein said first and second fault indication means are connected to said switching means in series, and said first and second fault indication means receive a fault indication when said switching means turns on to conduct power from a portion of said signal line which is free from said fault.

4. A line fault monitoring apparatus according to claim 3, wherein a protect diode is connected to each of said first and second fault indication means in series for preventing back flow.

5. A line fault monitoring apparatus according to claim 2, wherein each one of said line monitor devices is stored in a housing from which said signal line is elongated from two ends of said housing, and each of said first and second indication means are disposed near one of said two ends of said housing wherefrom said signal line is elongated.

6. A line fault monitoring apparatus according to claim 5, wherein said first and second fault indication means are disposed in said housing.

7. A line fault monitoring apparatus comprising:

receiving means;

a signal line elongated from said receiving means and connected to said receiving means in a loop form;

power supplying means for supplying power to said signal line;

a plurality of terminals, each of said terminals for monitoring a condition and sending information based on the monitoring; and a plurality of mid-point line monitor devices which are disposed along said signal line, each particular one of said mid-point line monitor devices including fault indication means for indicating a portion of said signal line, connected to said particular one mid-point line monitor device, as having fault, said fault indication means being located in a corresponding one of said line monitor devices along said signal line, and wherein said plurality of terminals are disposed such that at least one of said terminals is interposed between adjacent ones of said line monitor devices; and a beginning/end line monitoring means which includes a beginning terminal and an end terminal, each connected to an end of said signal line, and fault indication means for indicating an end of said signal line in which a fault occurs;

wherein, when said signal line is normal, power is supplied to said signal line through said beginning terminal of said beginning/end line monitoring means to sequentially operate said mid-point line monitor devices along said signal line to the end terminal of said beginning/end line monitoring device, and, when an actual fault occurs at a position in said signal line, the power supplied through the beginning terminal is shut off at a mid-point line monitoring device which is just before the position of said actual fault, the power is supplied through said end terminal, and the power is shut off at a mid-point monitoring device which is just after the position of said actual fault.

8. A line fault monitoring apparatus according to claim 7, wherein each said fault indication means comprises first fault indication means for indicating that the fault occurs in a first connection side in said signal line and second fault indication means for indicating that the fault occurs in a second connection side in said signal line.

9. A line fault monitoring apparatus according to claim 8, further comprising switching means which turns on when said actual fault of said signal line is detected, wherein said first and second fault indication means are connected to said switching means in series, and said first and second fault indication means receive a fault indication when said switching means turns on to conduct power from a portion of said signal line which is free from said fault.

10. A line fault monitoring apparatus according to claim 9, wherein a protect diode is connected to each of said first and second fault indication means in series for preventing back flow.

11. A line fault monitoring apparatus according to claim 7, wherein each said mid-point line monitor device is stored in a housing from which said signal line is elongated from two ends of said housing, and each of said first and second indication means are disposed near one of said two ends of said housing wherefrom said signal line is elongated.

12. A line fault monitoring apparatus according to claim 11, wherein said first and second fault indication means are disposed in said housing.

13. A line fault monitor according to claim 7, wherein said beginning/end line monitoring means includes beginning fault indicating means for indicating a fault in a portion of said signal line connected to said beginning terminal, second fault indicating means for indicating a fault in a portion of said signal line connected to said end terminal, and a representative indicating means for representatively indicating a fault in either of said portions of said signal line connected to the beginning terminal or the end terminal.

14. A line fault monitor according to claim 7, wherein said beginning/end line monitoring device includes:

beginning fault detecting means for detecting a fault in a portion of said signal line connected to said beginning terminal;

beginning fault indicating means for indicating a fault in the portion of said signal line connected to the beginning terminal when said beginning fault detecting means detects a fault;

end fault detecting means for detecting a fault in a portion of said signal line connected to said end terminal;

end fault indicating means for indicating a fault in the portion of said signal connected to said end terminal when said end fault detecting means detects a fault; and representative fault indicating means for representatively indicating a fault when either of said beginning fault detecting means or said end fault detecting means detect a fault.

15. A line fault monitor according to claim 7, wherein said beginning/end line monitoring device includes:

beginning fault detecting means for detecting a fault in a portion of said signal line connected to said beginning terminal;

beginning voltage drop detecting means for detecting a voltage drop in the portion of said signal line connected to said beginning terminal;

beginning fault indicating means for indicating a fault in the portion of said signal line connected to said beginning terminal when either said beginning fault detecting means detects a fault or said beginning voltage drop detecting means detects a voltage drop;

end fault detecting means for detecting a fault in a portion of said signal line connected to said end terminal;

end voltage drop detecting means for detecting a voltage drop in the portion of said signal line connected to said end terminal;

end fault indicating means for indicating a fault in the portion of said signal line connected to said end terminal when either said end fault detecting means detects a fault or said end voltage drop detecting means detects a voltage drop; and representative fault indicating means for representatively indicating a fault condition when at least one of said beginning fault detecting means or said end fault detecting means detect a fault or at least one of said beginning voltage drop detecting means or said end voltage drop detecting means detect a voltage drop.

* * * * *